United States Patent
Park et al.

(10) Patent No.: US 11,355,970 B2
(45) Date of Patent: Jun. 7, 2022

(54) WIRELESS POWER TRANSMISSION DEVICE, AND ELECTRONIC DEVICE FOR WIRELESSLY RECEIVING POWER AND OPERATING METHOD THEREFOR

(71) Applicant: SAMSUNG ELECTRONICS CO., LTD., Suwon-si (KR)

(72) Inventors: Jaeseok Park, Suwon-si (KR); Sanghyuk Wi, Suwon-si (KR); Youngho Ryu, Suwon-si (KR); Sungbum Park, Suwon-si (KR); Sungku Yeo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/969,091

(22) PCT Filed: Dec. 24, 2018

(86) PCT No.: PCT/KR2018/016556
§ 371 (c)(1),
(2) Date: Aug. 11, 2020

(87) PCT Pub. No.: WO2019/208902
PCT Pub. Date: Oct. 31, 2019

(65) Prior Publication Data
US 2021/0036560 A1     Feb. 4, 2021

(30) Foreign Application Priority Data

Apr. 27, 2018 (KR) .......................... 10-2018-0049112
Dec. 11, 2018 (KR) .......................... 10-2018-0158902

(51) Int. Cl.
*H02J 50/20* (2016.01)
*H02J 50/80* (2016.01)

(52) U.S. Cl.
CPC .............. *H02J 50/80* (2016.02); *H02J 50/20* (2016.02)

(58) Field of Classification Search
CPC .................................. H02J 50/20; H02J 50/80
(Continued)

(56) References Cited

U.S. PATENT DOCUMENTS

| 10,992,181 | B2* | 4/2021 | Shijo | ........................ | H02J 50/90 |
| 2012/0223590 | A1* | 9/2012 | Low | ........................ | H02J 50/80 |
| | | | | | 307/104 |

(Continued)

FOREIGN PATENT DOCUMENTS

| EP | 3 288 152 | 2/2018 |
| KR | 10-2011-0134969 | 12/2011 |

(Continued)

OTHER PUBLICATIONS

Extended Search Report dated Mar. 2, 2021 in counterpart European Application No. 18916499.9.

(Continued)

*Primary Examiner* — William Hernandez
(74) *Attorney, Agent, or Firm* — Nixon & Vanderhye, P.C.

(57) ABSTRACT

According to various embodiments, a wireless power transmission device comprises: a first-scheme communication circuit; a power source for generating a source signal; a power transmission circuit for forming an RF wave on the basis of the source signal; and a control circuit, wherein the control circuit can be configured to receive, from an electronic device supporting first-scheme communication and second-scheme communication, a communication signal including information on a communication environment according to the second-scheme communication through the first-scheme communication circuit, and to control, on the (Continued)

basis of the information on the communication environment according to the second-scheme communication, the frequency of the source signal generated by the power source and/or the transmission strength of the RF wave. Other various embodiments are possible.

18 Claims, 26 Drawing Sheets

(58) Field of Classification Search
USPC .......................................................... 307/104
See application file for complete search history.

(56) References Cited

U.S. PATENT DOCUMENTS

| | | |
|---|---|---|
| 2013/0047008 A1 | 2/2013 | Shin |
| 2013/0162051 A1* | 6/2013 | Michihata ............... H02J 50/80 307/104 |
| 2014/0312833 A1 | 10/2014 | Won et al. |
| 2015/0022016 A1 | 1/2015 | Kim et al. |
| 2015/0091706 A1 | 4/2015 | Chemishkian et al. |
| 2015/0365138 A1 | 12/2015 | Miller et al. |
| 2016/0197522 A1 | 7/2016 | Zeine et al. |
| 2017/0141818 A1* | 5/2017 | Umeda ................. H04B 5/0037 |
| 2017/0181087 A1* | 6/2017 | Kato .................... H02J 7/00034 |
| 2018/0034307 A1* | 2/2018 | Ha ......................... H02J 7/007 |
| 2018/0220988 A1* | 8/2018 | Jeon ...................... A61B 6/566 |
| 2018/0301941 A1* | 10/2018 | Kim .......................... G05F 1/66 |
| 2020/0153279 A1* | 5/2020 | Lee .......................... H02J 50/10 |

FOREIGN PATENT DOCUMENTS

| | | |
|---|---|---|
| KR | 10-2014-0124709 | 10/2014 |
| KR | 10-2015-0011447 | 2/2015 |
| KR | 10-2015-0031852 | 3/2015 |
| KR | 10-2016-0035750 | 4/2016 |
| WO | 2013/022207 | 2/2013 |
| WO | 2017/091312 | 6/2017 |

OTHER PUBLICATIONS

International Search Report for PCT/KR2018/016556 dated Mar. 22, 2019, 5 pages.
Written Opinion of the ISA for PCT/KR2018/016556 dated Mar. 22, 2019, 4 pages.

* cited by examiner

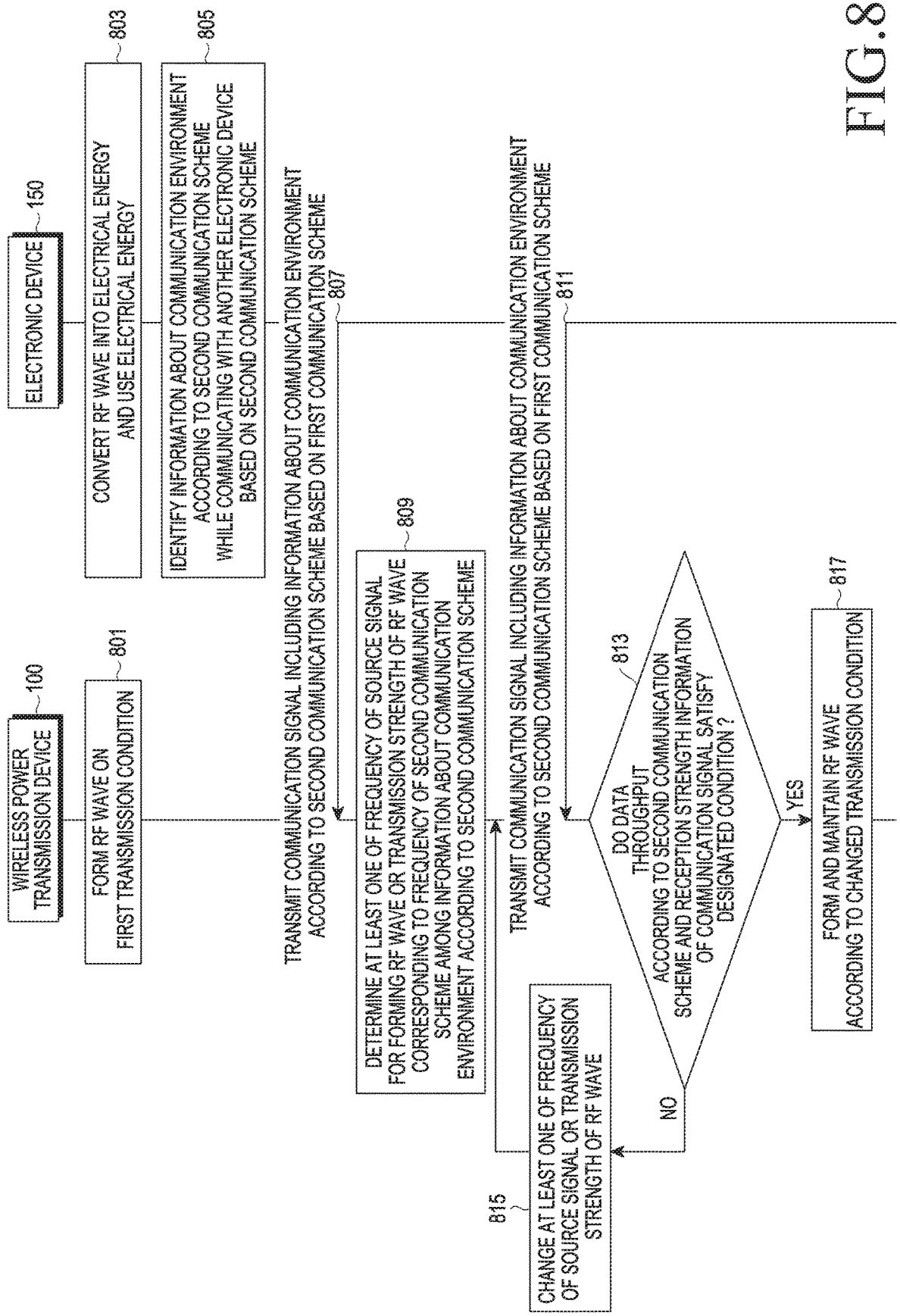

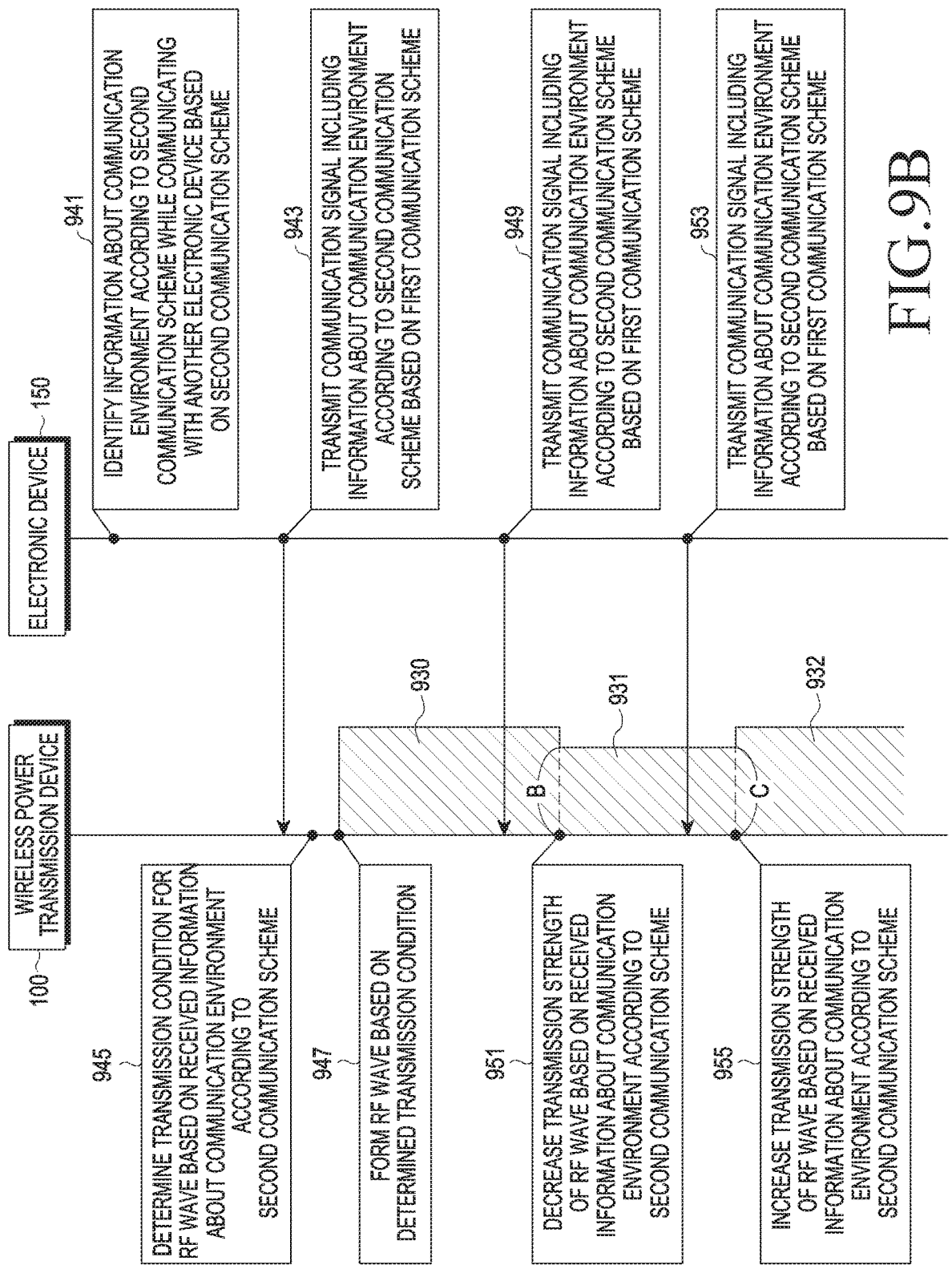

WIRELESS POWER TRANSMISSION DEVICE, AND ELECTRONIC DEVICE FOR WIRELESSLY RECEIVING POWER AND OPERATING METHOD THEREFOR

CROSS-REFERENCE TO RELATED APPLICATION(S)

This application is a National Phase Entry of PCT International Application No. PCT/KR2018/016556, which was filed on Dec. 24, 2018 and claims priority to Korean Patent Application No. 10-2018-0049112 filed on Apr. 27, 2018 and Korean Patent Application No. 10-2018-0158902 filed on Dec. 11, 2018 in the Korean Intellectual Property Office, the contents of which are incorporated herein by reference.

BACKGROUND

1. Field

Various embodiments relate to a wireless power transmission device, and an electronic device for wirelessly receiving power and an operating method thereof, and more particularly, to a wireless power transmission device and an electronic device for wirelessly receiving power which may communicate each other, and an operating method thereof.

2. Description of the Related Art

For many people in modern times, portable digital communication devices have become essential items. Consumers want to be provided with various high quality services they desire regardless of time or place. In addition, due to the recent development of Internet of Things (IoT), various sensors, home appliances, communication devices, etc., existing in our lives are being united via networking. In order to smoothly operate these various sensors, a wireless power transmission system is required.

Wireless power transmission scheme includes a magnetic induction scheme, a magnetic resonance scheme, and an electromagnetic wave scheme. The magnetic induction scheme or the magnetic resonance scheme is advantageous for charging an electronic device which is located at a relatively short distance from a wireless power transmission device. The electromagnetic wave scheme is advantageous for remote power transmission up to several meters compared with the magnetic induction scheme or the magnetic resonance scheme. The electromagnetic wave scheme is mainly used for remote power transmission, and may identify an exact location of a remote power receiver and transmit power most efficiently.

SUMMARY

An electronic device which wirelessly receives a power based on an electromagnetic wave scheme may wirelessly receive a power by converting a radio frequency (RF) wave formed from a wireless power transmission device into electrical energy. Meanwhile, the electronic device may communicate with another electronic device. In this case, if a frequency of the RF wave and a frequency for communication with the other electronic device are close, the RF wave and a communication signal may interfere with each other. Due to interference between the RF wave and the communication signal, a data rate (data throughput) of the communication signal may be decreased, or efficiency in wireless charging may be decreased.

Various embodiments may provide a wireless power transmission device which may receive information about a corresponding communication environment from an electronic device which performs a communication with another electronic device, and control a transmission condition for an RF wave based on the received information about the communication environment, and an operating method thereof. In addition, various embodiments may provide an electronic device to transmit information about a communication environment with another electronic device to a wireless power transmission device, and an operating method thereof.

According to various embodiments, a wireless power transmission device may comprise a first-scheme communication circuit, a power source configured to generate a source signal, a power transmission circuit configured to form an RF wave based on the source signal, and a control circuit, and the control circuit may be configured to: receive, from an electronic device which supports a first-scheme communication and a second-scheme communication, a communication signal including information about a communication environment according to the second-scheme communication via the first-scheme communication circuit, and control, based on the information about the communication environment according to the second-scheme communication, at least one of a frequency of the source signal generated by the power source or transmission strength of the RF wave.

According to various embodiments, an operating method of a wireless power transmission device which comprises a first-scheme communication circuit, a power source configured to generate a source signal, a power transmission circuit configured to form an RF wave based on the source signal, and a control circuit may comprise receiving, from an electronic device which supports a first-scheme communication and a second-scheme communication, a communication signal including information about a communication environment according to the second-scheme communication via the first-scheme communication circuit, and controlling, based on the information about the communication environment according to the second-scheme communication, at least one of a frequency of the source signal generated by the power source or transmission strength of the RF wave.

According to various embodiments, an electronic device may comprise a power reception circuit configured to convert an RF wave formed from a wireless power transmission device into electrical energy, a first-scheme communication circuit configured to perform a first-scheme communication with the wireless power transmission device, a second-scheme communication circuit configured to perform a second-scheme communication with an access point, and a control circuit, and the control circuit may be configured to: identify reception strength of a communication signal according to the second-scheme communication which is received via the second-scheme communication circuit, identify data throughput according to the second-scheme communication or a frequency according to the second-scheme communication, and transmit, to the wireless power transmission device, a communication signal according to the first-scheme communication including at least one of the reception strength of the communication signal according to the second-scheme communication, the data throughput according to the second-scheme communication, or the frequency according to the second-scheme communication via the first-scheme communication circuit.

According to various embodiments, a wireless power transmission device may comprise a first-scheme communication circuit, a second-scheme communication circuit, a power source configured to generate a source signal, a power transmission circuit configured to form an RF wave based on the source signal, and a control circuit, and the control circuit may be configured to: transmit and/or receive at least one first communication signal from and/or to an electronic device via the first-scheme communication circuit, transmit and/or receive at least one second communication signal from and/or to the electronic device via the second-scheme communication circuit, identify information about a communication environment of the second-scheme communication circuit based on at least one of the at least one second communication signal or information included in the at least one first communication signal, and control at least one of a frequency of the source signal generated by the power source or transmission strength of the RF wave based on the information about the communication environment of the second-scheme communication circuit.

According to various embodiments, a wireless power transmission device may comprise a first-scheme communication circuit, a second-scheme communication circuit, a power source configured to generate a source signal, a power transmission circuit configured to form an RF wave based on the source signal, and a control circuit, and the control circuit may be configured to: transmit and/or receive at least one first communication signal from and/or to an electronic device via the first-scheme communication circuit, transmit and/or receive at least one second communication signal from and/or to the electronic device via the second-scheme communication circuit, identify information about a communication environment of the second-scheme communication circuit based on at least one of the at least one second communication signal, or information included in the at least one first communication signal, and control a communication condition of the second-scheme communication circuit based on the information about the communication environment of the second-scheme communication circuit.

According to various embodiments, a wireless power transmission device may comprise a first-scheme communication circuit, a power source configured to generate a source signal, a power transmission circuit configured to form an RF wave based on the source signal, and a control circuit, and the control circuit may be configured to: control the power source and the power transmission circuit to transmit a beacon signal for turning on a first-scheme communication circuit of an electronic device for wirelessly receiving power, receive a communication signal which is transmitted from the first-scheme communication circuit of the electronic device based on the beacon signal via the first-scheme communication circuit, and control the power source and the power transmission circuit to transmit an RF wave for charging the electronic device in response to the reception of the communication signal.

According to various embodiments, a wireless power transmission device which may receive information about a corresponding communication environment from an electronic device which performs a communication with another electronic device, and control a transmission condition for an RF wave based on the received information about the communication environment, and an operating method thereof may be provided. In addition, according to various embodiments, an electronic device to transmit information about a communication environment with another electronic device to a wireless power transmission device, and an operating method thereof may be provided.

BRIEF DESCRIPTION OF THE DRAWINGS

FIG. 8 illustrates a flowchart for describing an operating method of a wireless power transmission device and an electronic device according to various embodiments;

FIG. 9B illustrates a flowchart for describing an operating method of a wireless power transmission device and an electronic device according to various embodiments;

DETAILED DESCRIPTION

Figure 1:
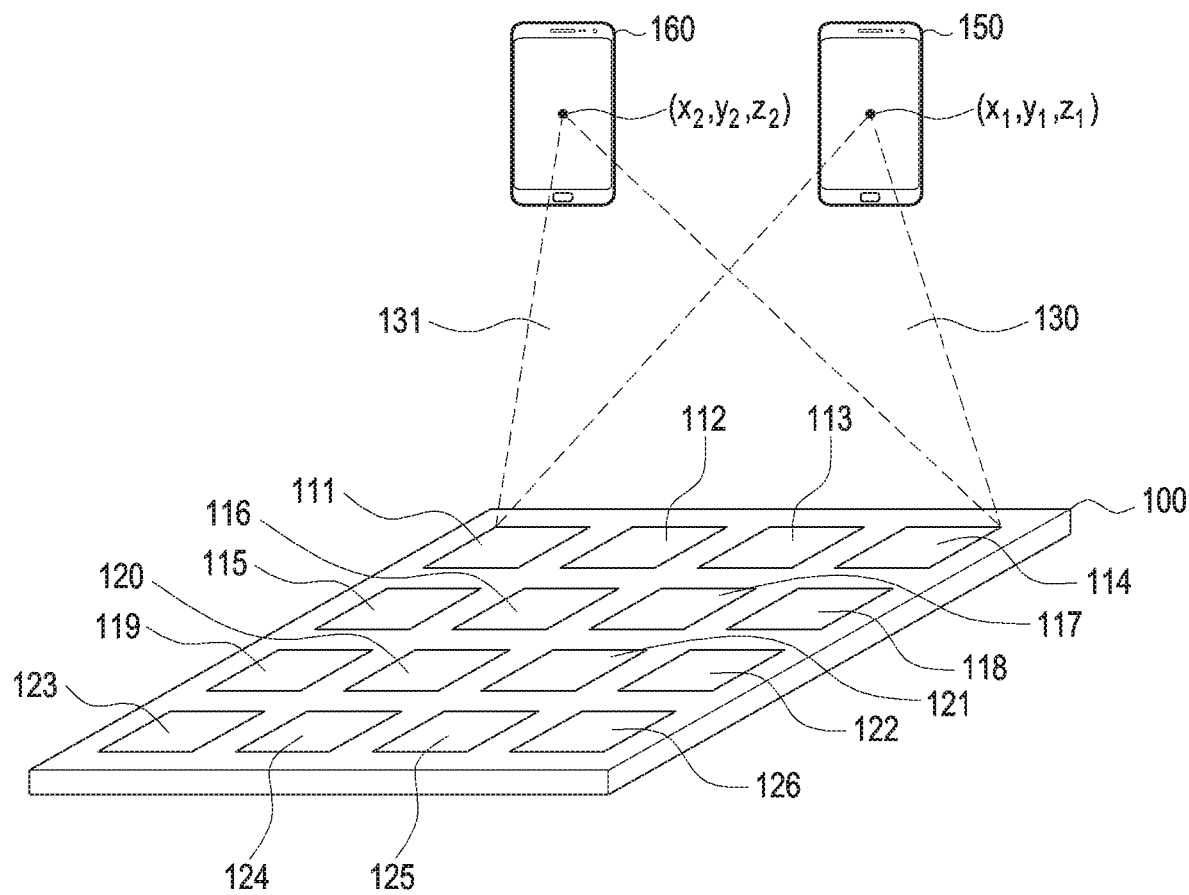
FIG. 1 is a conceptual diagram illustrating a wireless power transmission system according to various embodiments of the present invention.

Hereinafter, various embodiments in the present document will be described with reference to the accompanying drawings. The embodiments and the terms used therein are not intended to limit a technology disclosed in the present document to specific forms, and should be understood to include various modifications, equivalents, and/or alternatives to the corresponding embodiments. In describing the drawings, similar reference numerals may be used to designate similar components. A singular expression may include a plural expression unless they are definitely different in a context. In the present document, the expression "A or B" or "at least one of A and/or B" may include all possible combinations of items enumerated together. The expression "a first", "a second", "the first", or "the second" may modify various components regardless of the order and/or the importance, and is used merely to distinguish one component from another component without limiting the corresponding components. When a component (e.g., a first component) is referred to as being "(functionally or communicatively) connected," or "directly coupled" to another component (a second component), the component may be connected directly to the other component or connected to the other component through yet another component (e.g., a third component).

The expression "configured to" as used in the present document may be interchangeably used with, for example, "suitable for", "having the capacity to", "adapted to", "made to", "capable of", or "designed to" in terms of hardware or software, according to situations. Alternatively, in some situations, the expression "device configured to" may mean that the device, together with other devices or components, "is able to". For example, the phrase "processor adapted (or configured) to perform A, B, and C" may mean a dedicated processor (e.g., an embedded processor) for performing corresponding operations or a generic-purpose processor (e.g., a CPU or an application processor) that may perform corresponding operations by executing one or more software programs stored in a memory device.

A wireless power transmission device or an electronic device according to various embodiments of the present document may include at least one of, for example, a smart phone, a tablet PC, a mobile phone, a video phone, an electronic book reader, a desktop PC, a laptop PC, a netbook computer, a workstation, a server, a PDA, a portable multimedia player (PMP), an MP3 player, a medical device, a camera, and a wearable device. The wearable device may include at least one of an accessory type (e.g., a watch, a ring, a bracelet, an ankle bracelet, a necklace, a glasses, a contact lens, or a head-mounted device (HMD)), a fabric or clothing integrated type (e.g., an electronic clothing), a body-mounted type (e.g., a skin pad, or tattoo), or a bio-implantable circuit. In some embodiments, the wireless power transmission device or the electronic device may include at least one of, for example, a television, a set top box which is interworked wiredly or wirelessly with the television, a digital video disk (DVD) player, an audio, a refrigerator, an air conditioner, a cleaner, an oven, a microwave oven, a washing machine, an air purifier, a set top box, a home automation control panel, a security control panel, a media box, a game console, an electronic dictionary, an electronic key, a camcorder, an electric car, or an electronic picture frame.

In another embodiment, the wireless power transmission device or the electronic device may include at least one of various medical devices (e.g., various portable medical measuring devices (a blood glucose monitoring device, a heart rate monitoring device, a blood pressure measuring device, or a body temperature measuring device, etc.), a magnetic resonance angiography (MRA), a magnetic resonance imaging (MRI), a computed tomography (CT) machine, or an ultrasonic machine, and/or the like), a navigation device, a global positioning system (global navigation satellite system (GNSS)), an event data recorder (EDR), a flight data recorder (FDR), a vehicle infotainment device, an electronic device for a ship (e.g., a navigation device for a ship, and a gyro-compass, etc.), avionics, a security device, an automotive head unit, a robot for home or industry, a drone, an automatic teller's machine (ATM) in banks, point of sales (POS) in a shop, or internet device of things (e.g., a light bulb, various sensors, a sprinkler device, a fire alarm, a thermostat, a streetlamp, a toaster, sporting goods, a hot water tank, a heater, a boiler, etc.). According to an arbitrary embodiment, the wireless power transmitting device or the electronic device may include at least one of a part of furniture, a building/structure, or a car, an electronic board, an electronic signature receiving device, a projector, and various measuring devices (e.g., a water meter, an electric meter, a gas meter, or a radio wave meter, etc.). In various embodiments, the wireless power transmission device or the electronic device may be flexible, or may be a combination of two or more of various devices described above. The wireless power transmission device or the electronic device according to an embodiment in the present document is not limited to the above described devices. Herein, the term "user" may refer to a person who uses the electronic device or a device (e.g., an artificial intelligence electronic device) that uses the wireless power transmission device or the electronic device.

FIG. 1 is a conceptual diagram illustrating a wireless power transmission system according to various embodiments of the present invention.

A wireless power transmission device 100 may wirelessly transmit power to at least one electronic device 150 or 160. In various embodiments of the present invention, the wireless power transmission device 100 may include a plurality of patch antennas 111 to 126. The patch antennas 111 to 126 are not limited, as long as each of the patch antennas 111 to 126 is an antenna capable of generating an RF wave. At least one of an amplitude and a phase of an RF wave generated by each of the patch antennas 111 to 126 may be adjusted by the wireless power transmission device 100. For convenience of description, the RF wave generated by each of the patch antennas 111 to 126 will be referred to as a sub RF wave.

In various embodiments of the present invention, the wireless power transmission device 100 may adjust at least one of an amplitude and a phase of each of sub RF waves generated by the patch antennas 111 to 126. Meanwhile, the sub RF waves may interfere with each other. For example, the sub RF waves may constructively interfere with each other at one point, and may destructively interfere with each other at another point. The wireless power transmission device 100 according to various embodiments of the present invention may adjust at least one of the amplitude and the phase of each of the sub RF waves generated by the patch antennas 111 to 126 such that the sub RF waves constructively interfere with each other at a first point (x1, y1, z1).

For example, the wireless power transmission device 100 may determine that the electronic device 150 is disposed at the first point (x1, y1, z1). Here, a location of the electronic device 150 may be, for example, a point at which a power reception antenna of the electronic device 150 is located. An operation in which the wireless power transmission device 100 determines the location of the electronic device 150 will be described later in more detail. In order for the electronic device 150 to wirelessly receive a power with high efficiency, it is required for the sub RF waves to constructively interfere with each other at the first point (x1, y1, z1). Accordingly, the wireless power transmission device 100 may control the patch antennas 111 to 126 such that the sub RF waves constructively interfere with each other at the first point (x1, y1, z1). Here, a fact of controlling the patch antennas 111 to 126 may mean a fact of controlling a magnitude of a signal inputted to the patch antennas 111 to 126 or controlling a phase (or delay) of the signal inputted to the patch antennas 111 to 126. Meanwhile, a person ordinarily skilled in the art may readily understand beamforming, which is a technology for controlling RF waves to constructively interfere with each other at a specific point. In addition, a person ordinarily skilled in the art may also easily understand that there is no limitation on a type of beamforming used in the present invention. For example, various beamforming methods disclosed in US Patent Application Publication No. 2016/0099611, US Patent Application Publication No. 2016/0099755, and US Patent Application Publication No. 2016/0100124 may be used. A form of an RF wave formed by beamforming may be referred to as pockets of energy.

So, an amplitude of an RF wave 130 formed by the sub RF waves may be maximized at the first point (x1, y1, z1), and the electronic device 150 may receive a wireless power with high efficiency. Meanwhile, the wireless power transmission device 100 may detect that the electronic device 160 is disposed at a second point (x2, y2, z2). In order to charge the electronic device 160, the wireless power transmission device 100 may control the patch antennas 111 to 126 such that the sub RF waves constructively interfere with each other at the second point (x2, y2, z2). Accordingly, an RF wave 131 formed by the sub RF waves may have a maximum amplitude at the second point (x2, y2, z2), and the electronic device 160 may receive a wireless power with high efficiency.

In more detail, the electronic device 150 may be disposed relatively on the right. In this case, the wireless power transmission device 100 may apply relatively larger delay to sub RF waves formed from patch antennas (e.g., 114, 118, 122, and 126) which are disposed relatively on the right. That is, after sub RF waves formed from patch antennas (e.g., 111, 115, 119, and 123) which are disposed relatively on the left are formed first, the sub RF waves may be formed from the patch antennas (e.g., 114, 118, 122, and 126) which are disposed relatively on the right after a predetermined time elapses. Accordingly, sub RF waves may simultaneously meet at a relatively right point, that is, the sub RF waves may constructively interfere with each other at the relatively right point. If beamforming is performed at a relatively central point, the wireless power transmission device 100 may apply the substantially same delay to the patch antennas (e.g., 111, 115, 119, and 123) on the left and the patch antennas (e.g., 114, 118, 122, and 126) on the right. If the beamforming is performed at a point on the left, the wireless power transmission device 100 may apply larger delay to the patch antennas (e.g., 111, 115, 119, and 123) on the left compared to the patch antennas (e.g., 114, 118, 122, and 126) on the right. In another embodiment, the wireless power transmission device 100 may oscillate sub RF waves substantially simultaneously throughout the patch antennas 111 to 126, and perform beamforming by adjusting a phase which corresponds to the above described delay.

As described above, the wireless power transmission device 100 may determine the locations of the electronic devices 150 and 160 and make sub-RF waves constructively interfere with each other at the determined locations, thereby performing wireless charging with high transmission efficiency. The wireless power transmission device 100 according to various embodiments may identify the locations of the electronic devices 150 and 160 according to various schemes, and control a transmission condition for an RF wave so that constructive interference may occur at the identified locations.

In the present document, a fact that the wireless power transmission device 100 (or the electronic device 150) performs a specific operation may mean, for example, a fact that a processor included in the wireless power transmission device 100 (or, the electronic device 150) performs the specific operation or controls another hardware to perform the specific operation. Alternatively, the fact that the wireless power transmission device 100 (or the electronic device 150) performs the specific operation may mean, for example, a fact that the processor performs the specific operation or the other hardware performs the specific operation as an instruction stored in a memory included in the wireless power transmission device 100 (or the electronic device 150) is executed.

In various embodiments, the wireless power transmission device 100 may receive a communication signal which is based on a first communication scheme (e.g., a BLE communication) from the electronic device 150, and use the received communication signal to identify a direction in which the electronic device 150 is located. For example, the wireless power transmission device 100 may include a plurality of communication antennas, and may identify the direction in which the electronic device 150 is located based on various schemes such as TDOA, or FDOA, etc. The wireless power transmission device 100 may identify a distance between the wireless power transmission device 100 and the electronic device 150 based on reception strength (e.g., received signal strength indication (RSSI)) of the communication signal. The communication signal may include transmission strength, and the wireless power transmission device 100 may identify the distance between the wireless power transmission device 100 and the electronic device 150 based on the transmission strength of the communication signal and the reception strength of the communication signal. Alternatively, the communication signal may include information about a transmission time point. The wireless power transmission device 100 may also identify time of flight (TOF) of the communication signal based on the transmission time point of the communication signal and a time point at which the communication signal is received, and use the TOF to identify the distance between the wireless power transmission device 100 and the electronic device 150. In still another embodiment, the wireless power transmission device 100 may identify the location of the electronic device 150 based on vision recognition. Alternatively, the wireless power transmission device 100 may receive information about the location of the electronic device 150 directly from the electronic device 150. The electronic device 150 may identify the location of the electronic device 150 at least based on various indoor positioning schemes (e.g., an indoor positioning scheme using earth magnetic field map data, and an indoor positioning scheme using a signal outputted from an access point (AP)). The electronic device 150 may include the location information of the electronic device 150 into the communication signal and transmit the communication signal to the wireless power transmission device 100, whereby the wireless power transmission device 100 may identify the location of the electronic device 150. The wireless power transmission device 100 may receive the location information of the electronic device 150 from another electronic device which identifies locations of neighbor devices. It will be readily understood by those skilled in the art that there is no limitation on a manner that the wireless power transmission device 100 identifies the location of the electronic device 150. The wireless power transmission device 100 may control at least one of a plurality of phase shifters or a plurality of attenuators to form an RF wave corresponding to the location of the electronic device which is identified according to the various schemes described above.

Figure 2A:
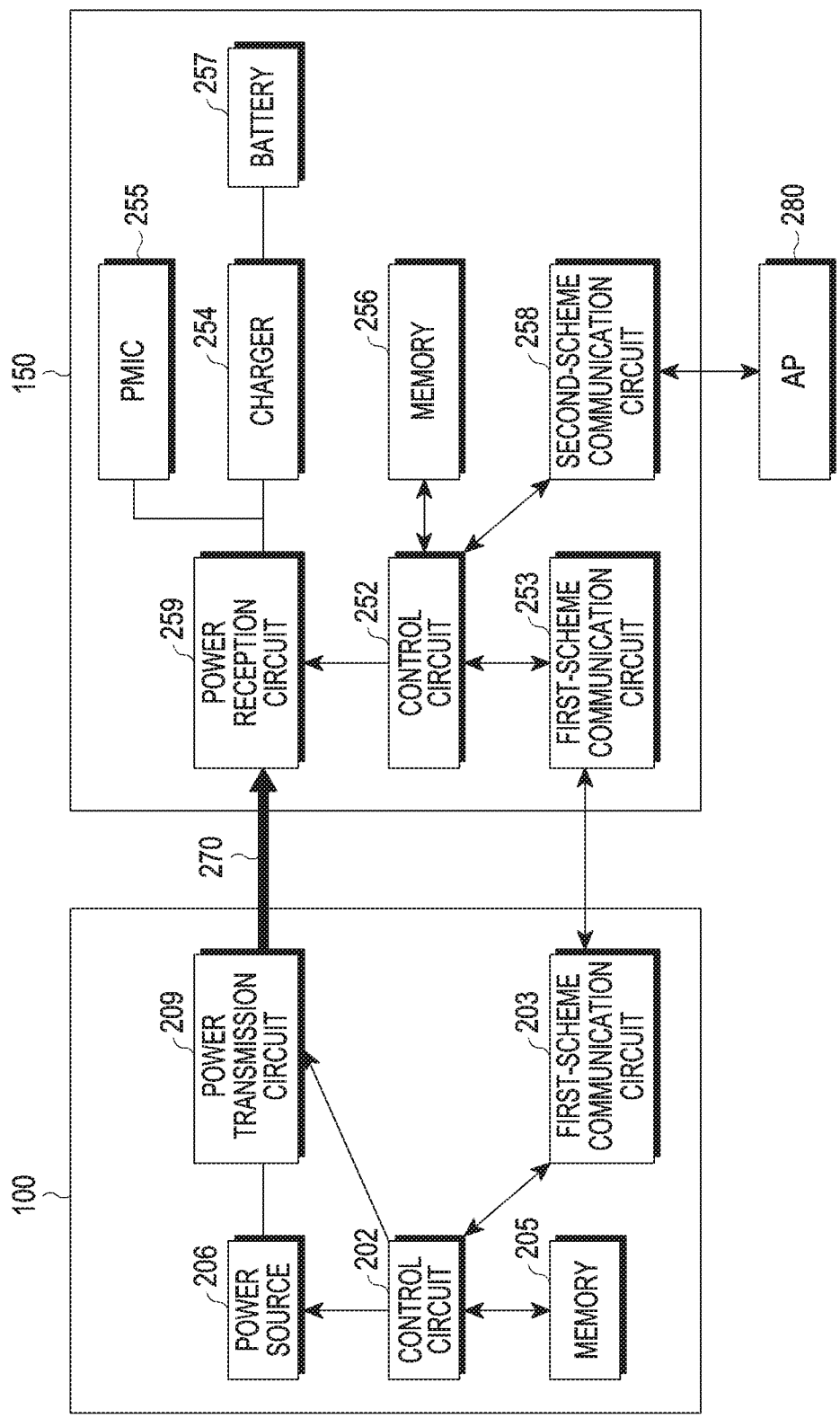
FIG. 2A is a block diagram illustrating a wireless power transmission device and an electronic device according to various embodiments.

FIG. 2*a* is a block diagram illustrating a wireless power transmission device and an electronic device according to various embodiments.

According to various embodiments, a wireless power transmission device 100 may include at least one of a control circuit 202, a first-scheme communication circuit 203, a memory 205, a power source 206, or a power transmission circuit 209. According to various embodiments, an electronic device 150 may include at least one of a control circuit 252, a first-scheme communication circuit 253, a charger 254, a power management integrated circuit (PMIC) 255, a memory 256, a battery 257, a second-scheme communication circuit 258, or a power reception circuit 259.

The power transmission circuit 209 according to various embodiments may wirelessly transmit a power to the power reception circuit 259 according to an electromagnetic wave scheme. That is, the power transmission circuit 209 may form an RF wave 270, and the power reception circuit 259 may convert the RF wave 270 into electrical energy. A detailed structure of the power transmission circuit 209 and the power reception circuit 259 will be described in more detail with reference to FIG. 2*b*. The control circuit 202 may control the power source 206 to control a frequency of a source signal generated by the power source 206. The control circuit 202 may control the frequency of the source signal generated by the power source 206 based on a frequency used by the second-scheme communication circuit 258 of the electronic device 150.

The second-scheme communication circuit 258 of the electronic device 150 may communicate with another electronic device (e.g., an access point (AP) 280) based on a second scheme (e.g., a Wi-fi communication scheme). If difference between a frequency of a communication signal transmitted and received by second-scheme communication circuit 258 and a frequency of the RF wave 270 formed in the power transmission circuit 209 is not large, interference between the RF wave 270 and the communication signal according to the second communication scheme may occur. A Wi-fi communication scheme as an example of the second scheme may use, for example, a frequency band with a center frequency of 5.0 GHz, and an RF wave may use a frequency band with a center frequency of 5.8 GHz. In this case, there is a possibility that the communication signal according to the second scheme and the RF wave may interfere with each another. Accordingly, the control circuit 202 may determine the frequency of the source signal generated by the power source 206 based on the frequency used by the second-scheme communication circuit 258. For example, the control circuit 202 may identify information about a channel being used by the second-scheme communication circuit 258, and determine the frequency of the source signal generated by the power source 206 such that the frequency of the source signal generated by the power source 206 differs from a frequency corresponding to the channel being used by a frequency interval which is greater than or equal to a threshold value.

The control circuit 252 may transmit, to the first-scheme communication circuit 203 of the wireless power transmission device 100, a communication signal including information about the frequency used by the second-scheme communication circuit 258 via the first-scheme communication circuit 253. The first communication scheme may be, for example, at least one of various short-range communication schemes such as a Bluetooth scheme, a Bluetooth low energy (BLE) scheme, a Wi-fi direct scheme, a Zig-bee scheme, and/or the like, and there is no limitation on a type thereof. The control circuit 202 may identify the frequency of the second communication scheme used by the electronic device 150 via the first-scheme communication circuit 203. The control circuit 202 may determine the frequency of the source signal generated by the power source 206 at least based on association information, which is stored in the memory 205, between a frequency of the second communication scheme and a frequency of the source signal.

Alternatively, the control circuit 202 may determine the frequency of the source signal generated by the power source 206 based on reception strength (e.g., received signal strength indication (RSSI)) and a data rate (data throughput) of a communication signal received in the second-scheme communication circuit 258. In this case, the electronic device 150 may transmit, to the wireless power transmission device 100, information about the reception strength and the data throughput of the communication signal received in the second-scheme communication circuit 258 via the first-scheme communication circuit 253. For example, the control circuit 202 may determine the frequency of the source signal generated by the power source 206 at least based on association information, which is stored in the memory 205, between a frequency of the source signal and data throughput per RSSI. Alternatively, the control circuit 202 may determine transmission strength of an RF wave formed in the power transmission circuit 209 based on the reception strength (e.g., the received signal strength indication (RSSI)) and the data throughput of the communication signal received in the second-scheme communication circuit 258. For example, the control circuit 202 may determine the transmission strength of the RF wave formed in the power transmission circuit 209 at least based on association information, which is stored in the memory 205, between transmission strength of an RF wave and data throughput per RSSI. The control circuit 202 may control the transmission strength of the RF wave by controlling at least one amplification circuit included in the power transmission circuit 209. The control circuit 202 may control a magnitude of a power applied to the power transmission circuit 209 by controlling a magnitude of a bias voltage of a power amplification circuit. The control circuit 202 may adjust a magnitude of a power outputted from the power source 206 by controlling a duty cycle or a frequency of the power outputted from the power source 206.

The control circuit 202 may identify a location of the electronic device 150 (for example, a location of the power reception circuit 259) based on various schemes described above, and may control a formation direction for the RF wave based thereon. For example, the control circuit 202 may control the formation direction for the RF wave by controlling a phase shifter or an attenuator included in the power transmission circuit 209.

The control circuit 202 or the control circuit 252 may be implemented with various circuits which may perform computation such as a general-purpose processor such as a CPU, a mini-computer, a microprocessor, a micro controlling unit (MCU), a field programmable gate array (FPGA), and/or the like, and there is no limitation on a type thereof.

The power reception circuit 259 according to various embodiments may wirelessly receive a power from the power transmission circuit 209 according to an electromagnetic wave scheme. The power reception circuit 259 may perform power processing for rectifying a power of a received AC waveform into a DC waveform, converting a voltage, or regulating a power. The PMIC 255 may process the power which is received and then processed to be suitable for a hardware, and transfer the processed power to each hardware. The control circuit 252 may control an overall operation of the electronic device 150. The memory 256 may store instructions for performing the overall operation of the electronic device 150. The charger 254 may charge the battery 257 using a power received from the power reception circuit 259.

The memory 205 may store instructions for performing operations of the wireless power transmission device 100. The memory 205 may store association information for various combinations between information (e.g., at least one of a frequency of a communication signal of the second-scheme communication circuit 258, RSSI of the communication signal of the second-scheme communication circuit 258, or data throughput of the second-scheme communication circuit 258) about a communication environment according to the second scheme of the electronic device 150 which is received via the first-scheme communication circuit 203, and a transmission condition for an RF wave (e.g., at least one of a frequency of an RF wave, or transmission strength of the RF wave) formed by the power transmission circuit 259. The memory 205 or the memory 256 may be implemented in various forms, such as a read only memory (ROM), a random access memory (RAM), or flash memory, etc. and there is no limitation on an implementation form thereof.

Figure 2B:
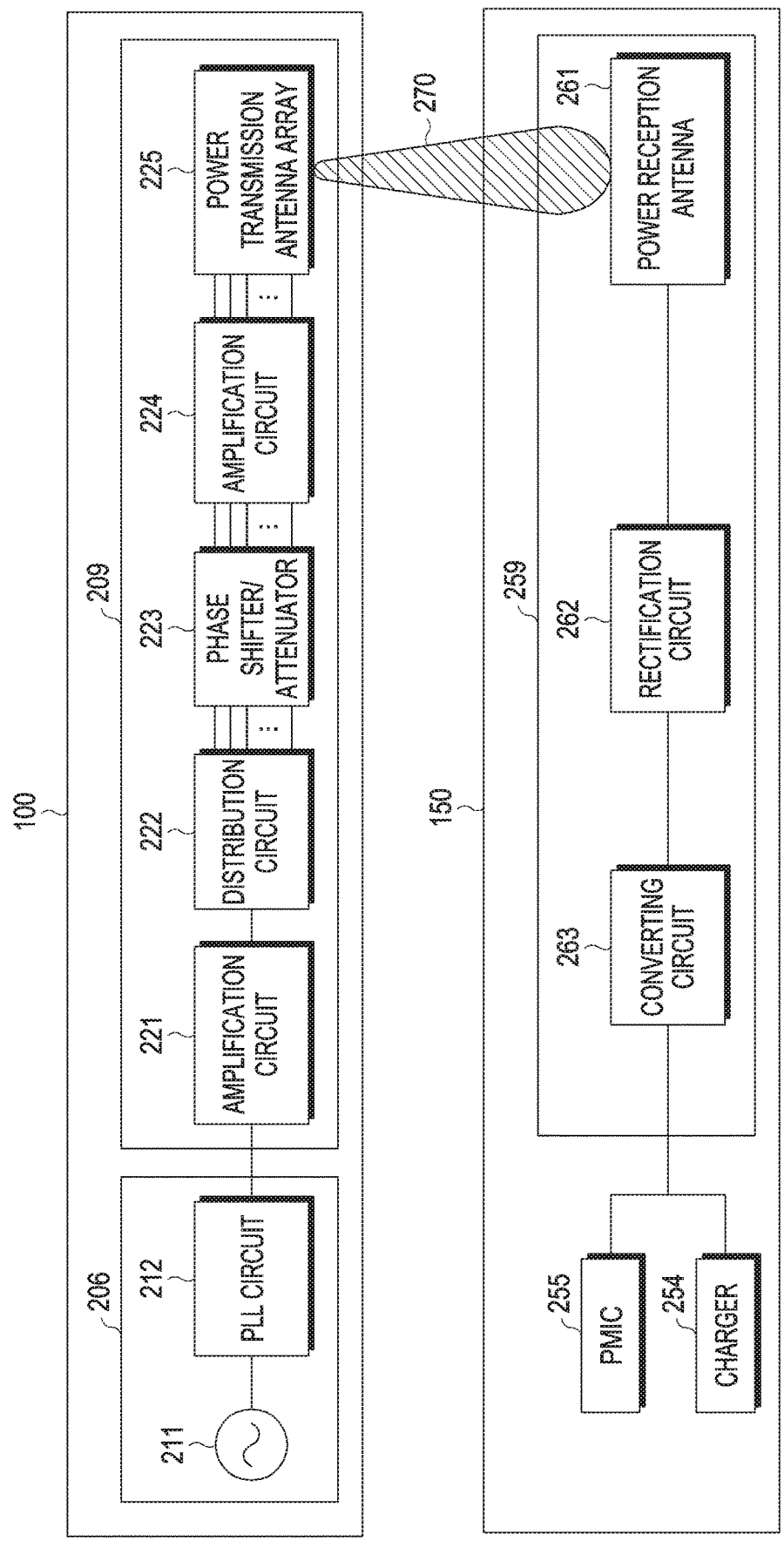
FIG. 2B is a detailed block diagram illustrating a power transmission circuit and a power reception circuit according to an electromagnetic-wave scheme according to various embodiments.

FIG. 2b is a detailed block diagram illustrating a power transmission circuit and a power reception circuit according to an electromagnetic wave scheme according to various embodiments.

In various embodiments of the present invention, a power source 206 may include a voltage-controlled oscillator (VCO) 211 and a phase looped lock (PLL) circuit 212. A power transmission circuit 209 may include an amplification circuit 221, a distribution circuit 222, a phase shifter 223, an amplification circuit 224, and a power transmission antenna array 225. In various embodiments of the present invention, a power reception circuit 259 may include a power reception antenna 261, a rectification circuit 262, and a converting circuit 263.

The VCO 211 may be an oscillator capable of outputting a source signal, and may adjust a frequency of the source signal based on an input voltage. The VCO 211 may be implemented in various forms such as a linear oscillator, a harmonic oscillator (e.g., a crystal oscillator, and an LC oscillator), a relaxation oscillator, and/or the like, and there is no limitation on a type thereof. The PLL circuit 212 may detect phase difference between an input signal and an output signal, control a phase of the VCO 211 with a voltage proportional to the phase difference, and control a phase of the output signal and a phase of the input signal to be the same. Accordingly, the power source 206 may change a frequency of a source signal outputted under external control, and make the source signal have a stable frequency.

The amplification circuit 221 may amplify the source signal provided from the power source 206 to provide the amplified source signal to the distribution circuit 222. The amplification circuit 221 may be implemented with various amplifiers such as a drive amplifier (DA), a high power amplifier (HPA), a Gain Block Amplifier (GBA), or a combination thereof, and there is no limitation on an implementation example thereof. The distribution circuit 222 may distribute the source signal outputted from the amplification circuit 221 into a plurality of sub source signals via a plurality of paths. There is no limitation on the distribution circuit 222 as long as it is a circuit capable of distributing an inputted power or signal to a plurality of paths. For example, the distribution circuit 222 may distribute the source signal to paths by as many as the number of patch antennas included in the power transmission antenna array 225. The phase shifter/attenuator 223 may perform at least one of shift (or delay) for a phase of each of a plurality of AC powers provided from the distribution circuit 222, or control of an amplitude of each of the plurality of AC powers. The phase shifter/attenuator 223 may be implemented in plural and, for example, may be implemented by as many as the number of patch antennas included in the power transmission antenna array 225. The phase shifter/attenuator 223 may be implemented by a phase shifter alone, or by an attenuator alone, or may be implemented to include all of the phase shifter and the attenuator. The phase shifter/attenuator 223 may include, for example, a phase shifter such as HMC642 or HMC1113, etc. At least one of a degree of phase shift or a degree of amplitude control of each phase shifter/attenuator 223 may be controlled by the control circuit 202. The control circuit 202 may identify a location of an electronic device 150, and perform at least one of shift for a phase of each of a plurality of AC powers or control for an amplitude of each of the plurality of AC powers so that, at the location of the electronic device 150 (or a location of the power reception circuit 259 of the electronic device 150), RF waves constructively interfere with each other, that is, the RF waves are beamformed. The amplification circuit 224 may amplify each of a plurality of AC powers outputted from the phase shifter/attenuator 223. Each of the plurality of patch antennas included in the power transmission antenna array 225 may generate sub RF waves based on a received power. An RF wave 270 wherein the sub RF waves interfere with each other may be converted into a current, a voltage, or a power in the power reception antenna 261 and outputted. The power reception antenna 261 may include a plurality of patch antennas, and may generate a current, a voltage, or a power of an AC waveform using an RF wave 270, i.e., an electromagnetic wave formed around the power reception antenna 261, and this may be referred to as a received power. The rectification circuit 262 may rectify the received power into a DC waveform. The converting circuit 263 may increase or decrease a voltage of a power of the DC waveform to a predetermined value and output the increased or decreased voltage to at least one of the PMIC 255 or the charger 254.

The control circuit 202 according to various embodiments may identify, based on a first-scheme communication, at least one of information about a frequency which the electronic device 150 uses based on a second-scheme communication, information about RSSI, or information about data throughput. The control circuit 202 may control at least one of the frequency of the source signal of the VCO 211 or a gain of the amplification circuit 221 or 224 based on the identified information.

Figure 3A:
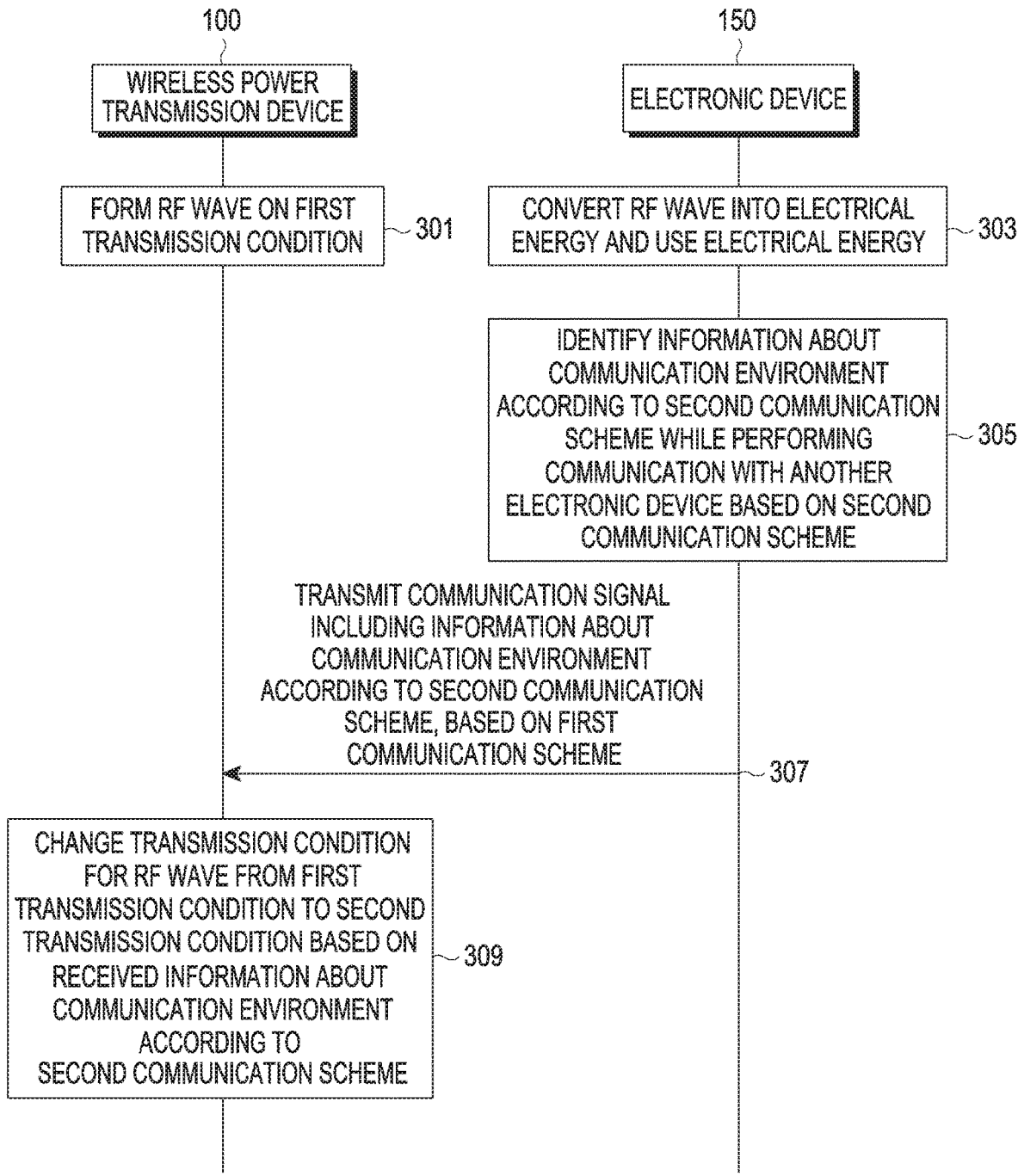
FIG. 3A illustrates a flowchart for describing an operating method of a wireless power transmission device and an electronic device according to various embodiments.

FIG. 3*a* illustrates a flowchart for describing an operating method of a wireless power transmission device and an electronic device according to various embodiments.

According to various embodiments, in operation 301, a wireless power transmission device 100 may form an RF wave on a first transmission condition, i.e., an initial transmission condition. For example, the transmission condition may include at least one of a frequency or transmission strength of the RF wave. It will be assumed that the wireless power transmission device 100 has identified a location of an electronic device 150 already, and accordingly, has identified a beamforming direction of the RF wave already. The wireless power transmission device 100 may control a VCO 211 to output a source signal of a first frequency, and control a gain of an amplification circuit (e.g., an amplification circuit 221, or 224) so that the RF wave has first transmission strength. The transmission condition may be expressed by information about an output frequency of the VCO 211 and the gain of the amplification circuit (e.g., the amplification circuit 221, or 224). According to various embodiments, the wireless power transmission device 100 may identify a location of the electronic device 150 in various schemes described above, and may form the RF wave based on the identified location of the electronic device 150. In various embodiments, a first frequency, or first transmission strength may be preset. Alternatively, the first frequency or the first transmission strength may be set based on various information identified by the wireless power transmission device 100. For example, the wireless power transmission device 100 may determine a first transmission condition based on a distance between the wireless power transmission device 100 and the electronic device 150. Alternatively, the wireless power transmission device 100 may determine the first transmission condition based on a state of the electronic device 150 (e.g., a battery charging state), or information about the electronic device 150 (e.g., battery capacity information), and/or the like.

In various embodiments, the wireless power transmission device 100 may establish a communication connection according to a first communication scheme with the electronic device 150. For example, if the first communication scheme is a BLE scheme, the wireless power transmission device 100 may establish a BLE connection with the electronic device 150, and transmit and receive a communication signal via the established BLE connection. For example, the wireless power transmission device 100 may perform a series of procedures for joining the electronic device 150 to a wireless power network managed by the wireless power transmission device 150 via the BLE connection.

In operation 303, the electronic device 150 may convert the RF wave into electrical energy and use the electrical energy. In operation 305, the electronic device 150 may identify information about a communication environment according to a second communication scheme while performing a communication with another electronic device (e.g., an AP) based on the second communication scheme. The second communication scheme may be, for example, a Wi-fi communication. In various embodiments, the information about the communication environment may include at least one of information about a frequency (or channel information) according to the second communication scheme, information about RSSI according to the second communication scheme, or data throughput according to the second communication scheme. In operation 307, the electronic device 150 may transmit a communication signal including the information about the communication environment according to the second communication scheme, based on the first communication scheme. The electronic device 150 may, for example, insert information related to a Wi-fi communication into a communication signal which is based on a BLE scheme, and transmit the communication signal. An example of a data frame of the communication signal will be described later in more detail with reference to FIGS. 7*a* and 7*b*. The wireless power transmission device 100 may identify the information about the communication environment according to the second communication scheme of the electronic device 150 based on the first communication scheme.

In operation 309, the wireless power transmission device 100 may change a transmission condition for the RF wave from the first transmission condition to a second transmission condition based on the received information about the communication environment according to the second communication scheme. For example, the wireless power transmission device 100 may change an input voltage of the VCO 211 so as to change the transmission frequency of the RF wave from the first frequency to a second frequency. Alternatively, the wireless power transmission device 100 may change the gain of the amplification circuit (e.g., the amplification circuit 221 or 224) so as to change transmission strength of the RF wave from the first strength to second strength. The wireless power transmission device 100 may simultaneously perform the change in the frequency and the change in the transmission strength. Alternatively, the wireless power transmission device 100 may sequentially perform the change in the frequency and the change in the transmission strength. For example, the wireless power transmission device 100 may be configured to first change the frequency of the RF wave and then change the transmission strength of the RF wave. The wireless power transmission device 100 may continue to receive the information about the communication environment according to the second communication scheme from the electronic device 150 based on the first communication scheme, and may change transmission strength according to the corresponding information.

Figure 3B:
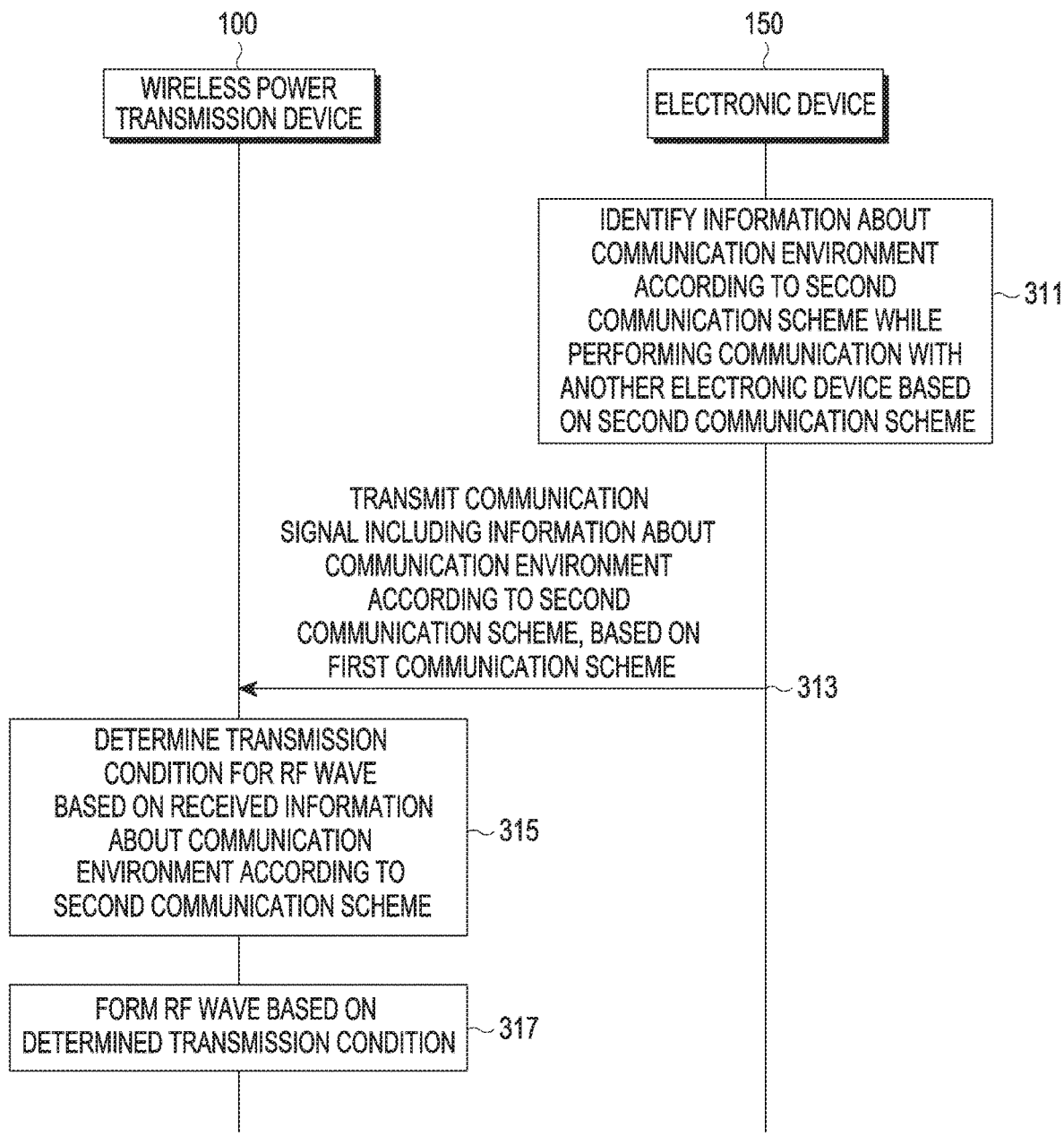
FIG. 3B illustrates a flowchart for describing an operating method of a wireless power transmission device and an electronic device according to various embodiments.

FIG. 3*b* illustrates a flowchart for describing an operating method of a wireless power transmission device and an electronic device according to various embodiments.

According to various embodiments, in operation 311, an electronic device 150 may identify information about a communication environment according to a second communication scheme while performing a communication with another electronic device based on the second communication scheme. In operation 313, the electronic device 150 may transmit a communication signal including the information about the communication environment according to the second communication scheme, based on a first communication scheme. For example, the electronic device 150 may establish a communication connection which is based on the first communication scheme with a wireless power transmission device 100 to request wireless power transmission. The electronic device 150 may transmit various communication signals to the wireless power transmission device 100 to request the wireless power transmission from the wireless power transmission device 100 or to subscribe a wireless power network managed by the wireless power transmission device 100. The electronic device 150 according to various embodiments may insert the information about the communication environment according to the second communication scheme into at least one of the various communication signals described above and transmit the communication signal to the wireless power transmission device 100. Alternatively, even before a subscription process, the electronic device 150 may insert the information about the communication environment according to the second communication scheme into a signal (e.g., an advertisement signal of a BLE communication scheme) for communication connection establishment, and transmit the signal.

In operation 315, the wireless power transmission device 100 may determine a transmission condition for an RF wave based on the received information about the communication environment according to the second communication scheme. That is, the wireless power transmission device 100 may determine an initial transmission condition for the RF wave based on the received information about the communication environment according to the second communication scheme. In operation 317, the wireless power transmission device 100 may form the RF wave based on the determined transmission condition.

Figure 4:
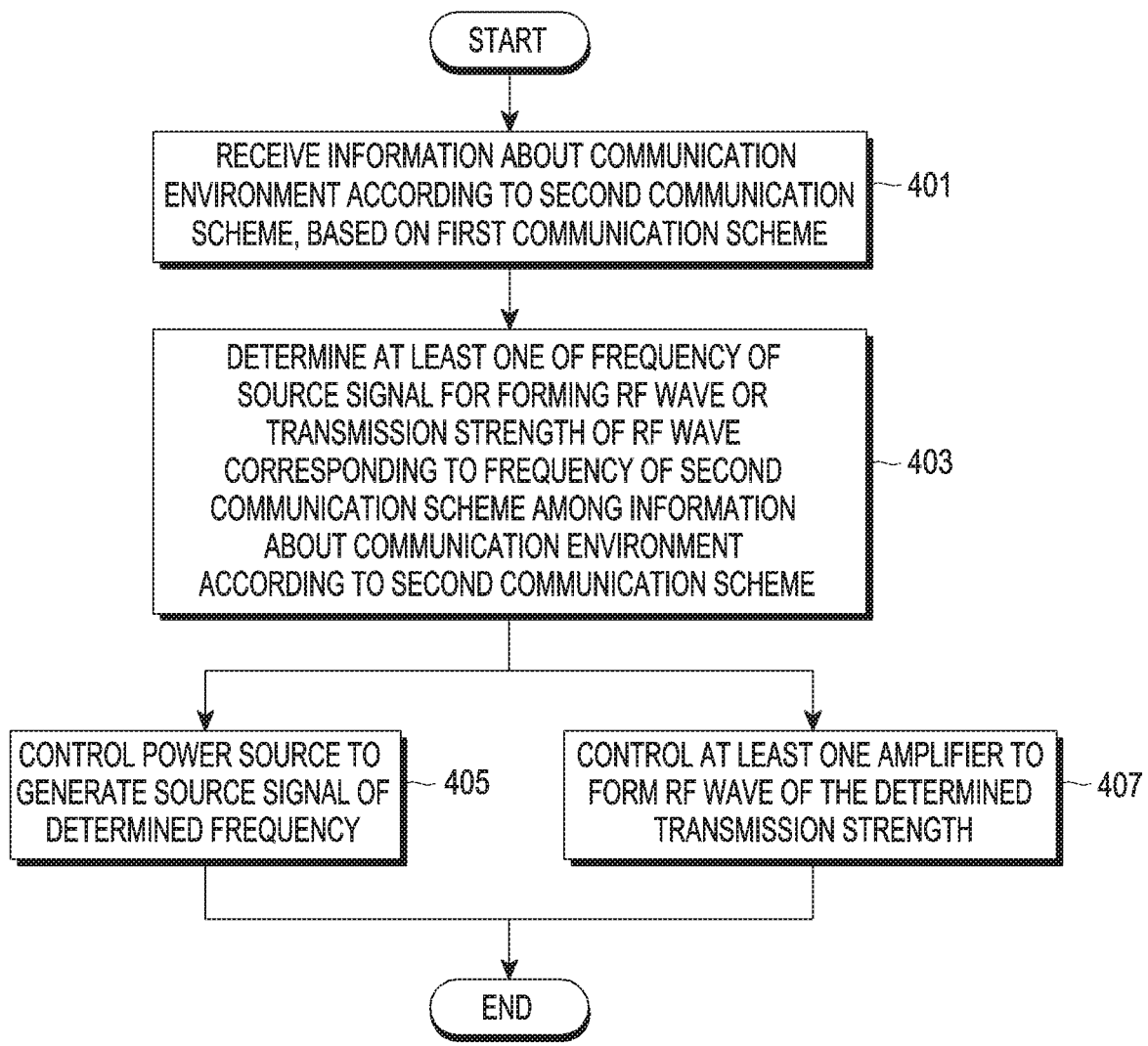
FIG. 4 illustrates a flowchart for describing an operating method of a wireless power transmission device according to various embodiments.
Figure 5:
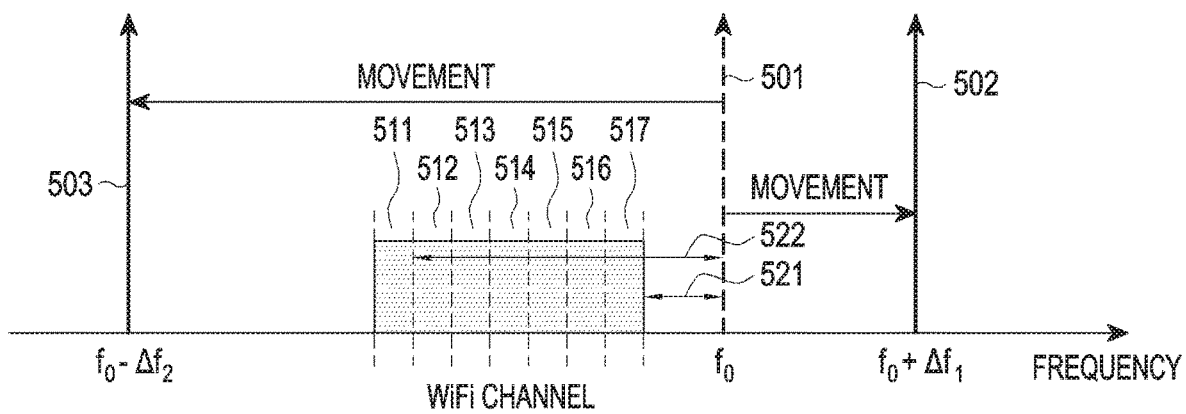
FIG. 5 illustrates an example of frequency hopping according to various embodiments.

FIG. 4 illustrates a flowchart for describing an operating method of a wireless power transmission device according to various embodiments. An embodiment in FIG. 4 will be described in more detail with reference to FIG. 5. FIG. 5 illustrates an example of frequency hopping according to various embodiments.

According to various embodiments, in operation 401, a wireless power transmission device 100 may receive information about a communication environment according to a second communication scheme from an electronic device 150 based on a first communication scheme. In operation 403, the wireless power transmission device 100 may determine at least one of a frequency of a source signal for forming an RF wave or transmission strength of the RF wave corresponding to a frequency of the second communication scheme among the information about the communication environment according to the second communication scheme. For example, the wireless power transmission device 100 may receive information indicating that the frequency according to the second communication scheme of the electronic device 150 is a third frequency while forming the RF wave at a first frequency. The wireless power transmission device 100 may identify whether difference between the first frequency and the third frequency is less than a threshold value. If it is identified that the difference between the first frequency and the third frequency is greater than or equal to the threshold value, the wireless power transmission device 100 may form the RF wave at the first frequency currently being used. If it is identified that the difference between the first frequency and the third frequency is less than the threshold value, the wireless power transmission device 100 may change a frequency of the RF wave from the first frequency to a second frequency. The wireless power transmission device 100 may identify the second frequency which differs by the threshold value from the third frequency. In another embodiment, the wireless power transmission device 100 may directly determine the frequency of the RF wave without calculating the difference, based on the third frequency of the second communication scheme used by the electronic device 150. For example, the wireless power transmission device 100 may determine the second frequency which is a value generated by adding the threshold value to the third frequency or subtracting the threshold value from the third frequency. The wireless power transmission device 100 according to various embodiments may directly perform the calculation of the difference or the operation of adding or subtracting the threshold value described above, or perform, based on a pre-stored selection rule (e.g., a lookup table), an operation of determining the second frequency based on the third frequency. In various embodiments, the threshold value may be changed according to various factors. For example, the threshold value may be set for the various factors such as a distance between the wireless power transmission device 100 and the electronic device 150, a direction of the electronic device 150, a type and setting of the electronic device 150 which receives power, and/or the like.

For example, referring to FIG. 5, the wireless power transmission device 100 may form an RF wave at a first frequency (f0) 501, and the first frequency (f0) 501 may be set as an initial condition. The wireless power transmission device 100 may receive information indicating that the electronic device 150 uses a seventh channel 517 among a plurality of Wi-fi channels 511 to 517. The electronic device 150 may identify that difference 521 between the first frequency (f0) 501 and the seventh channel 517 is less than a threshold value, and accordingly change a frequency of the RF wave to a second frequency (f0+Δf1) 502 or a third frequency (f0−Δf2) 503. Alternatively, the wireless power transmission device 100 may receive information indicating that the electronic device 150 uses a first channel 511 of Wi-fi. In this case, the wireless power transmission device 100 may identify that difference 522 between the first frequency (f0) 501 and the first channel 511 is greater than or equal to the threshold value, and accordingly, may maintain the first frequency (f0) 501 of the RF wave. Meanwhile, in another embodiment, the wireless power transmission device 100 may directly determine a changed frequency for the RF wave without calculating difference between a current frequency and a used frequency of the electronic device 150. For example, when receiving the information indicating that the electronic device 150 uses the seventh channel 517, the wireless power transmission device 100 may identify the third frequency (f0−Δf2) 503 which is set corresponding to the seventh channel 517. For example, when receiving the information indicating that the electronic device 150 uses the first channel 511, the wireless power transmission device 100 may identify the second frequency (f0+Δf1) 502 which is set corresponding to the first channel 511. The wireless power transmission device 100 may store, for example, association information that a frequency of an RF wave corresponds to each channel of the second communication scheme, and determine the frequency of the RF wave based on the association information. Meanwhile, in FIG. 5, it has been described that the wireless power transmission device 100 forms the RF wave at the first frequency (f0) 501 and then changes to another frequency (e.g., the second frequency (f0+Δf1) 502 or the third frequency (f0−Δf2) 503), but this is merely an illustrative example. In various embodiments, the wireless power transmission device 100 may receive information about a channel being used by the electronic device 150 before forming the RF wave, and determine an initial frequency of the RF wave based on the information. In this case, the wireless power transmission device 100 may form an RF wave of a frequency which differs by a value greater than or equal to the threshold value from the frequency according to the second communication scheme of the electronic device 150 from a time at which an initial RF wave is formed.

According to various embodiments, the wireless power transmission device 100 may adjust transmission strength of the RF wave corresponding to the frequency of the second communication scheme among the information about the communication environment according to the second communication scheme of the electronic device 150. For example, if difference between a transmission frequency of the wireless power transmission device 100 and the frequency of the second communication scheme of the electronic device 150 is less than the threshold value, the wireless power transmission device 100 may determine to decrease the transmission strength of the RF wave.

In operation 405, the wireless power transmission device 100 may control a power source to generate a source signal of the determined frequency. In operation 407, the wireless power transmission device 100 may control at least one amplifier to form an RF wave of the determined transmission strength. The wireless power transmission device 100 may perform one of frequency adjustment or transmission strength adjustment, or may perform the frequency adjustment and the transmission strength adjustment at the same time. Alternatively, the wireless power transmission device 100 may sequentially perform the frequency adjustment and the transmission strength adjustment, and there is no limitation on an execution order.

Figure 6:
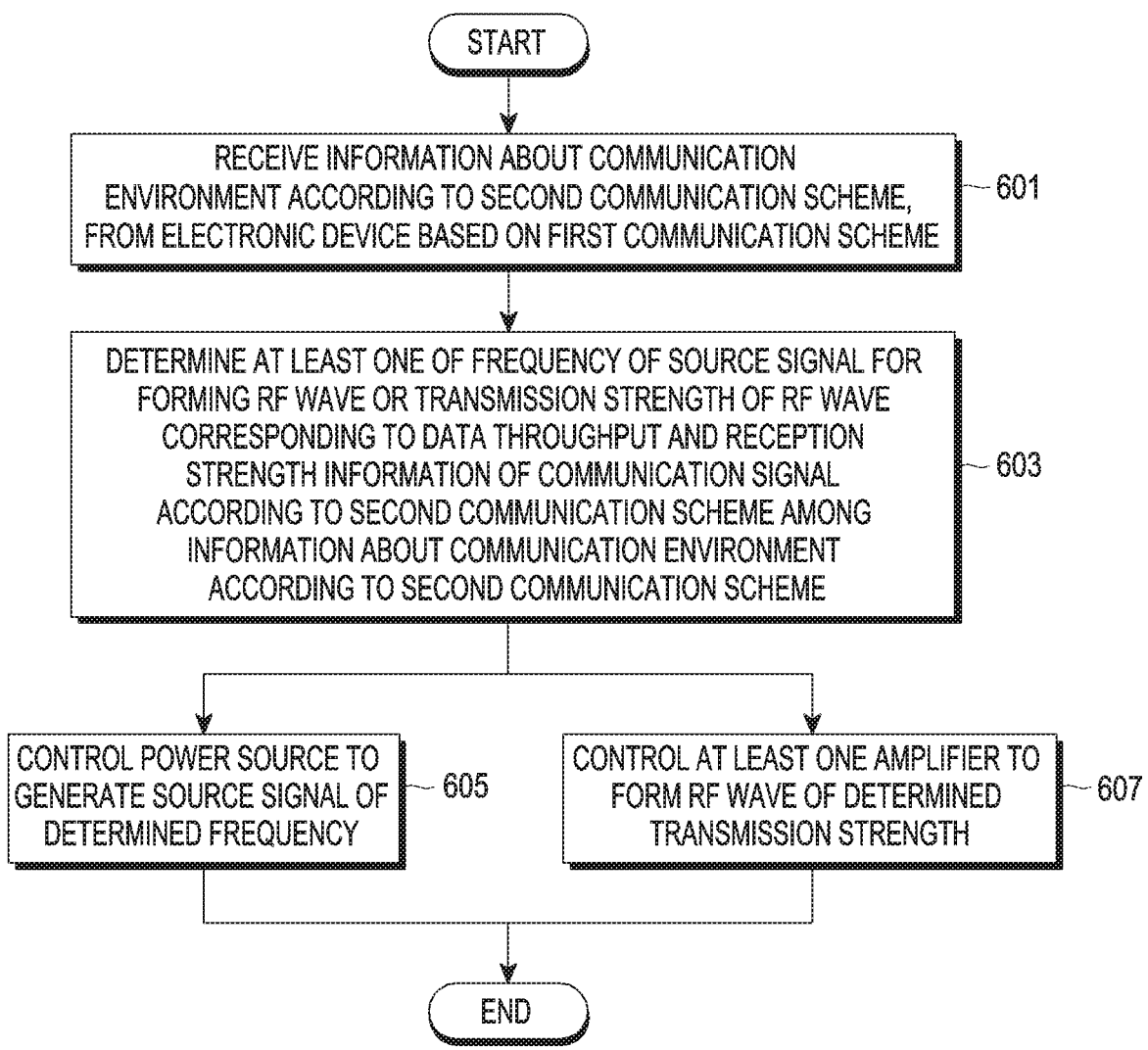
FIG. 6 illustrates a flowchart for describing an operating method of a wireless power transmission device according to various embodiments.

FIG. 6 illustrates a flowchart for describing an operating method of a wireless power transmission device according to various embodiments.

According to various embodiments, in operation 601, a wireless power transmission device 100 may receive information about a communication environment according to a second communication scheme from an electronic device based on a first communication scheme. In operation 603, the wireless power transmission device 100 may determine at least one of a frequency of a source signal for forming an RF wave or transmission strength of the RF wave corresponding to data throughput and reception strength information of a communication signal according to the second communication scheme among the information about the communication environment according to the second communication scheme. For example, the wireless power transmission device 100 may store association information for transmission strength of an RF wave according to data throughput per RSSI of a communication signal of the second communication scheme shown in Table 1.

TABLE 1

| RSSI of a communication signal of the second communication scheme | Data throughput of second communication scheme | Transmission strength adjustment degree for RF wave |
| --- | --- | --- |
| RSSI_1 | Data throughput_1 | ΔT1 |
|  | Data throughput_2 | ΔT2 |
|  | Data throughput_3 | ΔT3 |
|  | Data throughput_4 | ΔT4 |
| RSSI_2 | Data throughput_1 | ΔT5 |
|  | Data throughput_2 | ΔT6 |
|  | Data throughput_3 | ΔT7 |
|  | Data throughput_4 | ΔT8 |

The wireless power transmission device 100 may receive RSSI of a second-communication scheme communication signal and data throughput of the second communication scheme from the electronic device 150 via the first communication scheme. The wireless power transmission device 100 may identify a degree of transmission strength adjustment for the RF wave by comparing the association information shown in Table 1 with the received information. In various embodiments, even if the data throughput of the second communication scheme is constant, the degree of the transmission strength adjustment for the RF wave may be different according to the RSSI of the second-communication scheme communication signal. In operation 605, the wireless power transmission device 100 may control a power source to generate the source signal of the determined frequency. In operation 607, the wireless power transmission device 100 may control at least one amplifier to form the RF wave of the determined transmission strength. The wireless power transmission device 100 according to various embodiments may perform one of operation 605 or operation 607. Alternatively, the wireless power transmission device 100 may perform operation 605 and operation 607 at the same time. Alternatively, the wireless power transmission device 100 may sequentially perform operation 605 and operation 607, and there is no limitation on an execution order.

In various embodiments, the wireless power transmission device 100 may store association information for RSSI of a second-communication scheme communication signal and a degree of transmission strength adjustment for an RF wave. In this case, the wireless power transmission device 100 may receive, from the electronic device 150, information about the RSSI of the second-scheme communication signal of the electronic device 150 based on the first communication scheme. The wireless power transmission device 100 may adjust transmission strength of the RF wave based on the stored association information and the received information. Alternatively, the wireless power transmission device 100 may store association information for data throughput of the second communication scheme and a degree of transmission strength adjustment for an RF wave. In this case, the wireless power transmission device 100 may receive, from the electronic device 150, information about the data throughput of the second communication scheme of the electronic device 150 based on the first communication scheme. The wireless power transmission device 100 may adjust transmission strength of the RF wave based on the stored association information and the received information.

According to various embodiments, the wireless power transmission device 100 may store association information for transmission strength of an RF wave, not an adjustment degree of the transmission strength of the RF wave for various conditions described above, and determine the transmission strength of the RF wave based on the corresponding association information.

According to various embodiments, the wireless power transmission device 100 does not adjust the transmission strength of the RF wave based on the association information, and may operate in a manner of adjusting the transmission strength of the RF wave until information received from the electronic device 150 satisfies a designated condition. For example, the wireless power transmission device 100 may store association information shown in Table 2.

TABLE 2

| RSSI of second communication signal | Minimum value of appropriate data throughput of second communication scheme |
| --- | --- |
| RSSI_1 | Data throughput_1 |
| RSSI_2 | Data throughput_2 |

The wireless power transmission device 100 may receive, from the electronic device 150, the information about the RSSI of the second-communication scheme communication signal and the data throughput of the second communication scheme based on the first communication scheme. The wireless power transmission device 100 may identify whether the received data throughput of the second communication scheme is greater than or equal to a minimum value of appropriate data throughput of the second communication scheme identified according to the association information. If it is identified that the received data throughput of the second communication scheme is greater than or equal to the minimum value of the appropriate data throughput of the second communication scheme identified corresponding to the RSSI, the wireless power transmission device 100 may maintain transmission strength of a current RF wave. If it is identified that the received data throughput of the second communication scheme is less than the minimum value (e.g., 70%) of the appropriate data throughput of the second communication scheme identified corresponding to the RSSI, the wireless power transmission device 100 may decrease the transmission strength of the RF wave by a designated strength. The wireless power transmission device 100 then continuously receives, from the electronic device 150, information about the RSSI of the second-communication scheme communication signal and the data throughput of the second communication scheme based on the first communication scheme. The wireless power transmission device 100 may decrease the transmission strength of the RF wave until the data throughput of the electronic device 150 is greater than or equal to the identified minimum value of the appropriate data throughput of the second communication scheme. Meanwhile, the association information in Table 2 is merely exemplary, and the wireless power transmission device 100 may store a threshold value of the RSSI of the second-communication scheme communication signal or a threshold value of the data throughput of the second communication scheme. The wireless power transmission device 100 may decrease the transmission strength of the RF wave until the RSSI of the second-communication scheme communication signal which is received based on the first communication scheme is greater than or equal to the threshold value of the RSSI. Alternatively, the wireless power transmission device 100 may decrease the transmission strength of the RF wave until the data throughput of the second communication scheme which is received based on the first communication scheme is greater than or equal to the threshold value of the data throughput.

Figure 7A:
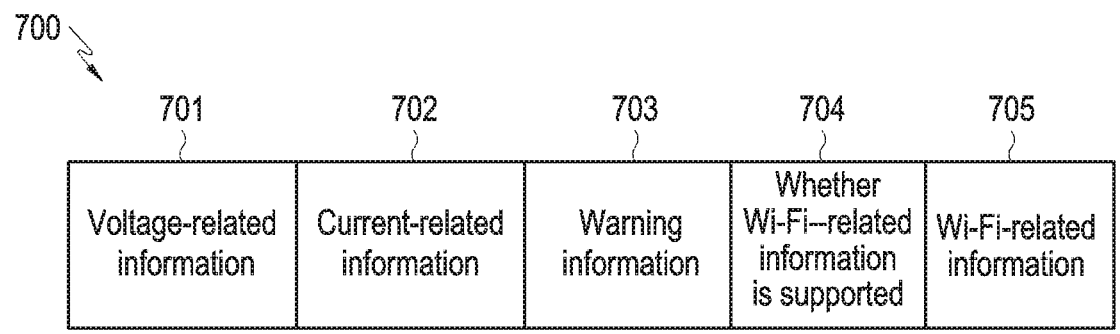
FIGS. 7A and 7B illustrate a data format of a communication signal according to various embodiments.
Figure 7B:
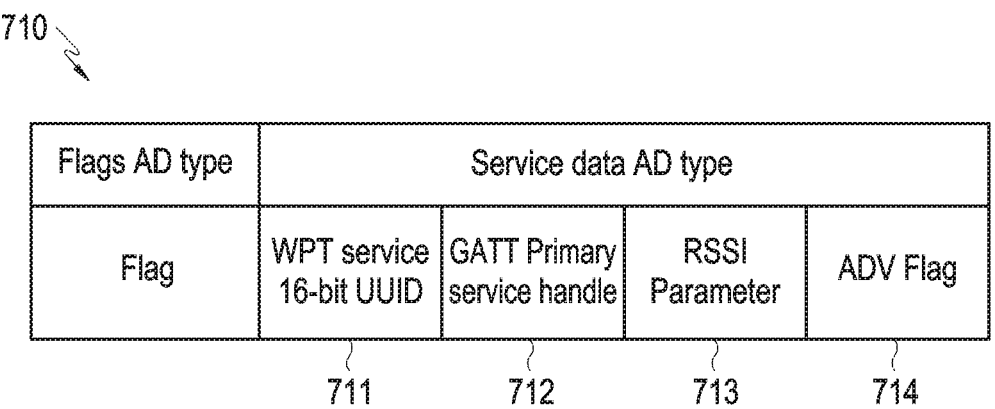

FIGS. 7a and 7b illustrate a data format of a communication signal according to various embodiments.

An electronic device 150 according to various embodiments may periodically or aperiodically transmit, for example, a communication signal of a first data format 700 illustrated in FIG. 7a to a wireless power transmission device 100. According to various embodiments, the electronic device 150 may transmit the communication signal of the first data format 700 after receiving a power from the wireless power transmission device 100. In various embodiments, the first data format 700 may be supported according to, for example, a BLE communication scheme, but there is no limitation on a type of a supported communication scheme. The first data format 700 may include a voltage-related information field 701, a current-related information field 702, a warning information field 703, a field 704 indicating whether Wi-fi-related information is supported, and a Wi-fi-related information field 705. For example, a voltage value at a pre-designated point (e.g., at least one of an input terminal of a rectification circuit or an output terminal of the rectification circuit) of the electronic device 150 may be included in the voltage-related information field 701. For example, a current value at a pre-designated point (e.g., at least one of the input terminal of the rectification circuit or the output terminal of the rectification circuit) of the electronic device 150 may be included in the current-related information field 702. The wireless power transmission device 100 may identify a magnitude of a power received by the electronic device 150 based on the value included in the voltage-related information field 701 or the current-related information field 702, and adjust strength of an RF wave using the magnitude of the power received by the electronic device 150. Information about an event which occurs in the electronic device 150 may be included in the warning information field 703, and the wireless power transmission device 100 may perform various operations such as an operation of stopping wireless charging, and/or the like according to the information included in the warning information field 703.

A value indicating whether the electronic device 150 supports other communication scheme-related information (e.g., Wi-fi-related information) may be included in the field 704 indicating whether the Wi-fi-related information is supported, for example, in a flag form. For example, at least one of information about a Wi-fi frequency (or information about a channel) used by the electronic device 150, information about RSSI of a Wi-fi communication signal, or data throughput according to Wi-fi may be included in the Wi-fi related information field 705. The wireless power transmission device 100 may receive the Wi-fi-related information of the electronic device 150 based on the BLE, and adjust at least one of a frequency or transmission strength of a transmitted RF wave based on the Wi-fi-related information as described above.

The electronic device 150 according to various embodiments may transmit a communication signal of a second data format 710 illustrated in FIG. 7b, for example, according to a broadcasting scheme. The second data format 710 may be, for example, a data format of an advertisement signal according to a BLE communication. For example, identification information of a wireless charging-related service may be included in a WPT service 16-bit UUID field 711. A GATT primary service handle field 712 may include, for example, attribute handles for various supported services. Handles may be defined, for example, to be numbered in order from a GATT primary service handle. For example, a handle value for an information providing service of another communication scheme (e.g., Wi-fi) used by the electronic device 150 may be defined, and the corresponding defined value and information related to the other communication scheme may be included in the corresponding field 712. Information about transmission strength of the advertisement signal may be included in an RSSI parameter field 713. Information such as impedance shift, reboot, OVL state, whether to support a time set, presence pulse-related information, beacon extension request, etc., defined in an AFA standard may be included in an ADV flag field 714. Meanwhile, there is no limitation on a field in which information related to the other communication scheme (for example, the Wi-fi) is included, and the information may be included in any signal transmitted by the electronic device 150 before charging starts as well as the advertisement signal. The wireless power transmission device 100 may determine a transmission condition for an initial RF wave based on the information related to the other communication scheme (e.g., the Wi-fi) received from the electronic device 150. Meanwhile, in various embodiments, the wireless power transmission device 100 may receive the communication signal of the second data format 710 to determine the transmission condition for the initial RF wave, and may receive the communication signal of the first data format 700 to adjust a transmission condition for an RF wave after charging starts.

FIG. 8 illustrates a flowchart for describing an operating method of a wireless power transmission device and an electronic device according to various embodiments.

According to various embodiments, a wireless power transmission device 100 may form an RF wave on a first transmission condition in operation 801. In operation 803, an electronic device 150 may convert the RF wave into electrical energy and use the electrical energy. In operation 805, the electronic device 150 may identify information about a communication environment according to a second communication scheme while communicating with another electronic device based on the second communication scheme. The information about the communication environment may include, for example, at least one of information about a frequency, information about RSSI, or information about data throughput. In operation 807, the electronic device 150 may transmit a communication signal including the information about the communication environment according to the second communication scheme, based on a first communication scheme. For example, the electronic device 150 may insert the information about the communication environment according to the second communication scheme into at least some fields in a data format supported in the first communication scheme, and transmit a communication signal of the corresponding data format to the wireless power transmission device 100.

In operation 809, the wireless power transmission device 100 may determine at least one of a frequency of a source signal for forming an RF wave or transmission strength of the RF wave corresponding to a frequency of the second communication scheme among the information about the communication environment according to the second communication scheme. The wireless power transmission device 100 may form the RF wave based on at least one of the determined frequency or transmission strength. In operation 811, the electronic device 150 may transmit a communication signal including the information about the communication environment according to the second communication scheme, based on the first communication scheme. In operation 813, the wireless power transmission device 100 may identify whether data throughput according to the second communication scheme and reception strength information of the communication signal satisfy a designated condition. For example, the wireless power transmission device 100 may previously store information about a minimum value of appropriate data throughput for each piece of reception strength information of a second-communication scheme communication signal, and may identify whether received data throughput is greater than information about a minimum value of appropriate data throughput. If it is identified that the designated condition is not satisfied, in operation 815, the wireless power transmission device 100 may change at least one of the frequency of the source signal or the transmission strength of the RF wave. The wireless power transmission device 100 may change the at least one of the frequency of the source signal or the transmission strength of the RF wave based on an adjustment degree which corresponds to information received through a communication, or a value which corresponds to the information received through the communication. Alternatively, the wireless power transmission device 100 may change the at least one of the frequency of the source signal or the transmission strength of the RF wave based on a value set irrespective of the information received through the communication. The wireless power transmission device 100 may receive a first-scheme communication signal from the electronic device 150, and may repeatedly identify whether the designated condition is satisfied. If it is identified that the designated condition is satisfied, in operation 817, the wireless power transmission device 100 may form an RF wave according to a changed transmission condition. Although not shown in FIG. 8, the wireless power transmission device 100 may receive the first-scheme communication signal from the electronic device 150 even after operation 817. If it is identified that the designated condition is not satisfied, the wireless power transmission device 100 may change the transmission condition for the RF wave.

Figure 9A:
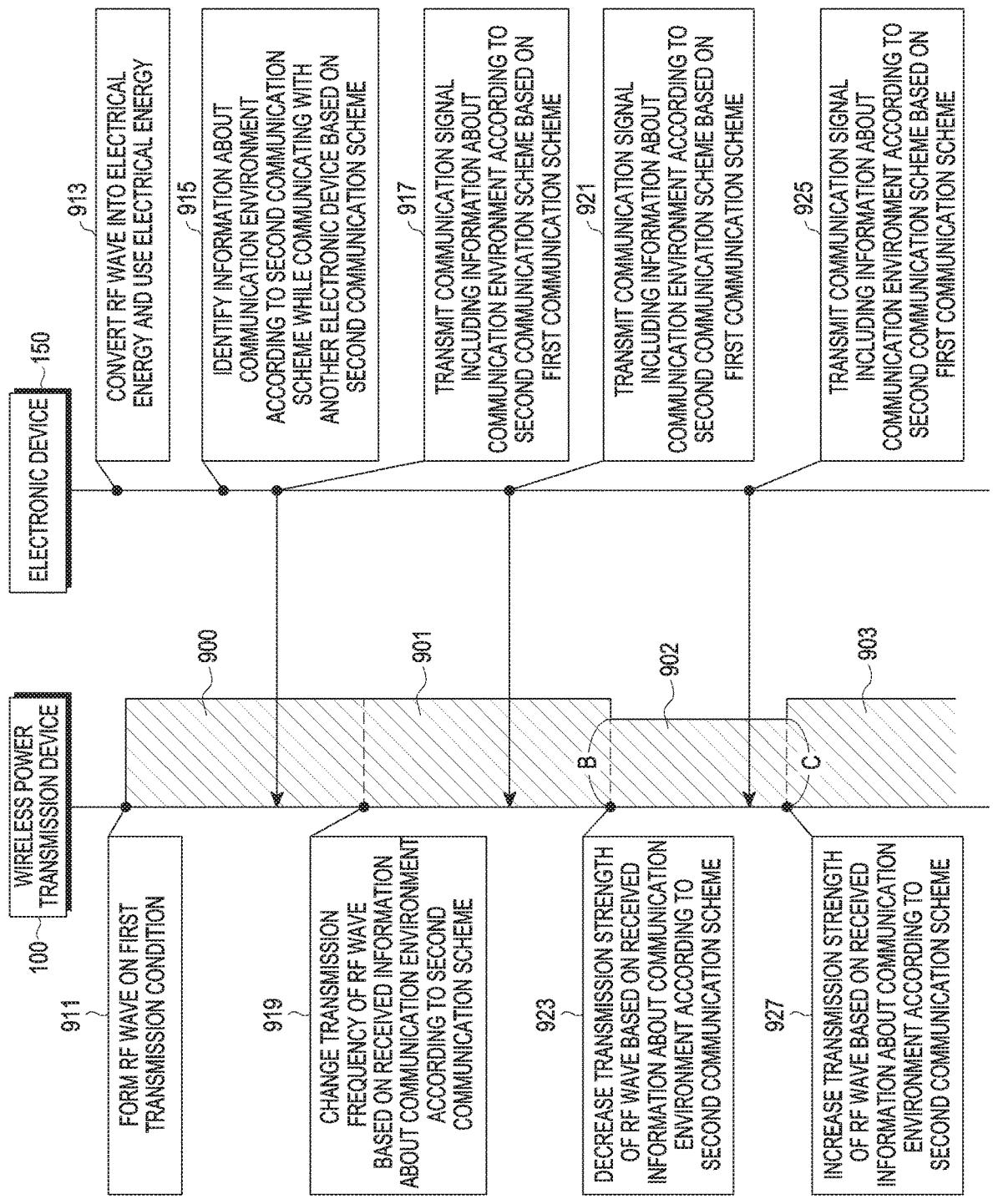
FIG. 9A illustrates a flowchart for describing an operating method of a wireless power transmission device and an electronic device according to various embodiments.

FIG. 9a illustrates a flowchart for describing an operating method of a wireless power transmission device and an electronic device according to various embodiments.

According to various embodiments, a wireless power transmission device 100 may form an RF wave on a first transmission condition in operation 911. The wireless power transmission device 100 may determine an initial transmission condition for the RF wave based on, for example, various information such as a location of an electronic device 150 with respect to the wireless power transmission device 100, information about a state of the electronic device 150, and/or the like. For example, the wireless power transmission device 100 may form an RF wave 900 at transmission strength of A. In operation 913, the electronic device 150 may convert the RF wave into electrical energy and use the electrical energy. In operation 915, the electronic device 150 may identify information about a communication environment according to a second communication scheme while communicating with another electronic device based on the second communication scheme. In operation 917, the electronic device 150 may transmit a communication signal including the information about the communication environment according to the second communication scheme to the wireless power transmission device 100 based on a first communication scheme.

In operation 919, the wireless power transmission device 100 may change a transmission frequency of the RF wave based on the received information about the communication environment according to the second communication scheme. For example, the wireless power transmission device 100 may set the transmission frequency of the RF wave so that the transmission frequency of the RF wave differs by a value greater than or equal to a threshold value from the received frequency of the second communication scheme. In this case, the wireless power transmission device 100 may form an RF wave 901 at a changed frequency transmission strength of A.

In operation 921, the electronic device 150 may transmit a communication signal including the information about the communication environment according to the second communication scheme based on the first communication scheme. In operation 923, the wireless power transmission device 100 may decrease the transmission strength of the RF wave based on the received information about the communication environment according to the second communication scheme. For example, the wireless power transmission device 100 may identify that the information about the communication environment according to the second communication scheme does not satisfy a designated condition, and decrease the transmission strength of the RF wave corresponding to the identification. For example, the wireless power transmission device 100 may form an RF wave 902 of a magnitude of B. In operation 925, the electronic device 150 may transmit a communication signal including the information about the communication environment according to the second communication scheme, based on the first communication scheme. In operation 927, the wireless power transmission device 100 may increase transmission strength of the RF wave based on the received information about the communication environment according to the second communication scheme. The wireless power transmission device 100 may increase the transmission strength of the RF wave when it is identified that the information about the communication environment according to the second communication scheme satisfies the designated condition. For example, the wireless power transmission device 100 may form an RF wave 903 of a magnitude of C. If it is identified that the information about the communication environment according to the second communication scheme does not satisfy the designated condition via a received communication signal, the wireless power transmission device 100 may decrease the transmission strength of the RF wave. Meanwhile, in operation 927, it is merely exemplary to increase the transmission strength of the RF wave, and the wireless power transmission device 100 according to various embodiments may be configured to maintain a current transmission condition if it is identified that the received information about the communication environment according to the second communication scheme satisfies the designated condition.

FIG. 9b illustrates a flowchart for describing an operating method of a wireless power transmission device and an electronic device according to various embodiments.

According to various embodiments, in operation 941, while performing a communication with another electronic device based on a second communication scheme, an electronic device 150 may identify information about a communication environment according to the second communication scheme. In operation 943, the electronic device 150 may transmit a communication signal including the information about the communication environment according to the second communication scheme to a wireless power transmission device 100 based on a first communication scheme. The electronic device 150 may transmit the communication signal including the information about the communication environment according to the second communication scheme before receiving an RF wave from the wireless power transmission device 100. For example, the electronic device 150 may include the information about the communication environment according to the second communication scheme into at least one of a communication signal used to establish a communication connection with the wireless power transmission device 100, or a communication signal used to subscribe to a power network managed by the wireless power transmission device 100 to transmit the communication signal.

In operation 945, the wireless power transmission device 100 may determine a transmission condition for the RF wave based on the received information about the communication environment according to the second communication scheme. In operation 947, the wireless power transmission device 100 may form an RF wave, for example, an RF wave 930 of transmission strength of A, based on the determined transmission condition. In this case, the wireless power transmission device 100 may control a power source so that a frequency of the RF wave 930 differs by a value greater than or equal to a designated threshold value from a frequency of the second communication scheme used by the electronic device 150.

In operation 949, the electronic device 150 may transmit a communication signal including the information about the communication environment according to the second communication scheme, based on the first communication scheme. In operation 951, the wireless power transmission device 100 may decrease transmission strength of the RF wave based on the received information about the communication environment according to the second communication scheme. For example, the wireless power transmission device 100 may decrease the transmission strength of the RF wave in response to identifying that the received information about the communication environment according to the second communication scheme does not satisfy a designated condition. For example, the wireless power transmission device 100 may form an RF wave 931 of transmission strength of B. In operation 953, the electronic device 150 may transmit a communication signal including the information about the communication environment according to the second communication scheme, based on the first communication scheme. In operation 955, the wireless power transmission device 100 may increase transmission strength of the RF wave based on the received information about the communication environment according to the second communication scheme. For example, the wireless power transmission device 100 may form an RF wave 932 of transmission strength of C. Thereafter, if it is identified that information about a communication environment according to the second communication scheme does not satisfy the designated condition via a received communication signal, the wireless power transmission device 100 may decrease transmission strength of the RF wave. Meanwhile, in operation 927, it is merely exemplary to increase transmission strength of the RF wave, and the wireless power transmission device 100 according to various embodiments may be configured to maintain a current transmission condition if it is identified that the received information about the communication environment according to the second communication scheme satisfies the designated condition.

Figure 10:
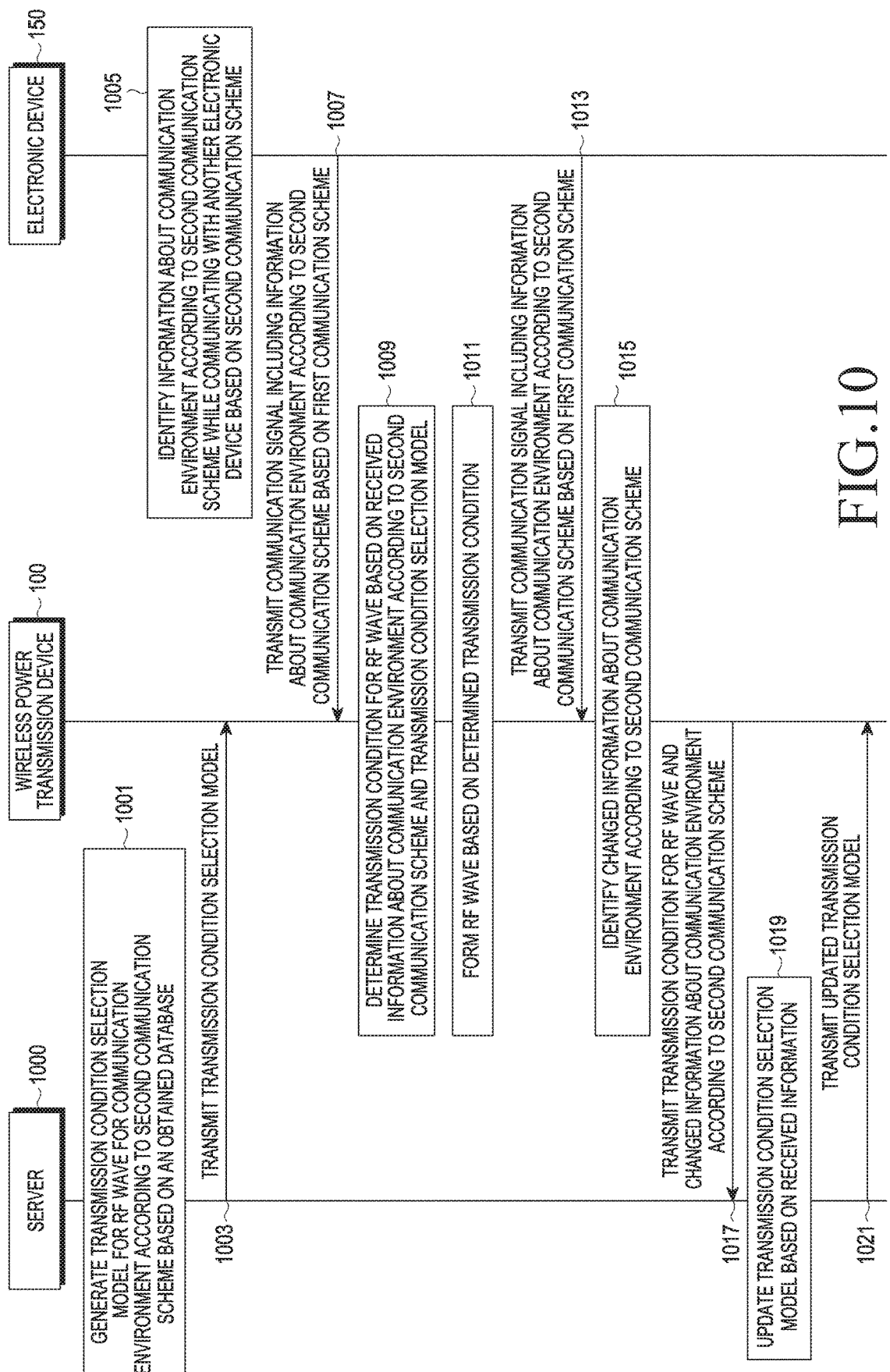
FIG. 10 illustrates a flowchart for describing an operating method of a wireless power transmission device, an electronic device, and a server according to various embodiments.

FIG. 10 illustrates a flowchart for describing an operating method of a wireless power transmission device, an electronic device, and a server according to various embodiments.

According to various embodiments, in operation 1001, a server 1000 may generate a transmission condition selection model for an RF wave for a communication environment according to a second communication scheme, based on an obtained database. For example, the server 1000 may include a communication module capable of communicating with at least one of a wireless power transmission device 100 or an electronic device 150, a processor capable of generating the transmission condition selection model for the RF wave, and a memory capable of storing the obtained database. The server 1000 may receive, from the wireless power transmission device 100 or another wireless power transmission device, a transmission condition for the RF wave, and information about a communication environment according to the second communication scheme of the electronic device 150. For example, the wireless power transmission device 100 may generate a learned transmission condition selection model for the RF wave by using the transmission condition for the RF wave, and the information about the communication environment according to the second communication scheme of the electronic device 150. The transmission condition selection model for the RF wave may be a rule-based model or an artificial intelligence model which is learned according to at least one of machine learning, a neural network, or a deep learning algorithm. In operation 1003, the server 1000 may transmit the transmission condition selection model to the wireless power transmission device 100. The transmission condition selection model may include, for example, association information between at least one factor of the communication environment according to the second communication scheme (e.g., at least one of a frequency of the second communication scheme, RSSI of a second-communication scheme communication signal, or data throughput of the second communication scheme) and a transmission condition for the RF wave (e.g., at least one of a transmission frequency of the RF wave, or transmission strength of the RF wave).

In operation 1005, the electronic device 150 may identify the information about the communication environment according to the second communication scheme while communicating with another electronic device based on the second communication scheme. In operation 1007, the electronic device 150 may transmit a communication signal including the information about the communication environment according to the second communication scheme, based on the first communication scheme. In operation 1009, the wireless power transmission device 100 may determine a transmission condition for the RF wave based on the transmission condition selection model and the received information about the communication environment according to the second communication scheme. In more detail, the wireless power transmission device 100 may input the received information about the communication environment according to the second communication scheme of the received electronic device 150 as an input value of the transmission condition selection model. The wireless power transmission device 100 may identify a transmission condition for the RF wave which is an output value of the transmission condition selection model. In operation 1011, the wireless power transmission device 100 may form an RF wave based on the determined transmission condition. In operation 1013, the electronic device 150 may transmit a communication signal including the information about the communication environment according to the second communication scheme, based on the first communication scheme. In operation 1015, the wireless power transmission device 100 may identify changed information about the communication environment according to the second communication scheme. In operation 1017, the wireless power transmission device 100 may transmit the transmission condition for the RF wave and the changed information about the communication environment according to the second communication scheme to the server 1000. In operation 1019, the server 1000 may update the transmission condition selection model based on the received information. In operation 1021, the server 1000 may transmit the updated transmission condition selection model to the wireless power transmission device 100. The server 1000 may receive a database not only from the wireless power transmission device 100 but also from the other wireless power transmission device, and may perform an update based on the database. In various embodiments, the server 1000 may manage the transmission condition selection model for various information such as a relative location of the electronic device 150 with respect to the wireless power transmission device 100, state information of the electronic device 150, a model of the electronic device 150, and/or the like. In this case, the wireless power transmission device 100 may transmit information such as identified relative position, the state information of the electronic device 150, the model of the electronic device 150, and/or the like to the server 1000, and receive a corresponding transmission condition selection model. Alternatively, the wireless power transmission device 100 may transmit, to the server 1000, the information about the communication environment according to the second communication scheme received from the electronic device 150, and the server 1000 may transmit, to the wireless power transmission device 100, a transmission condition for the RF wave which corresponds to the received information about the communication environment according to the second communication scheme.

Figure 11:
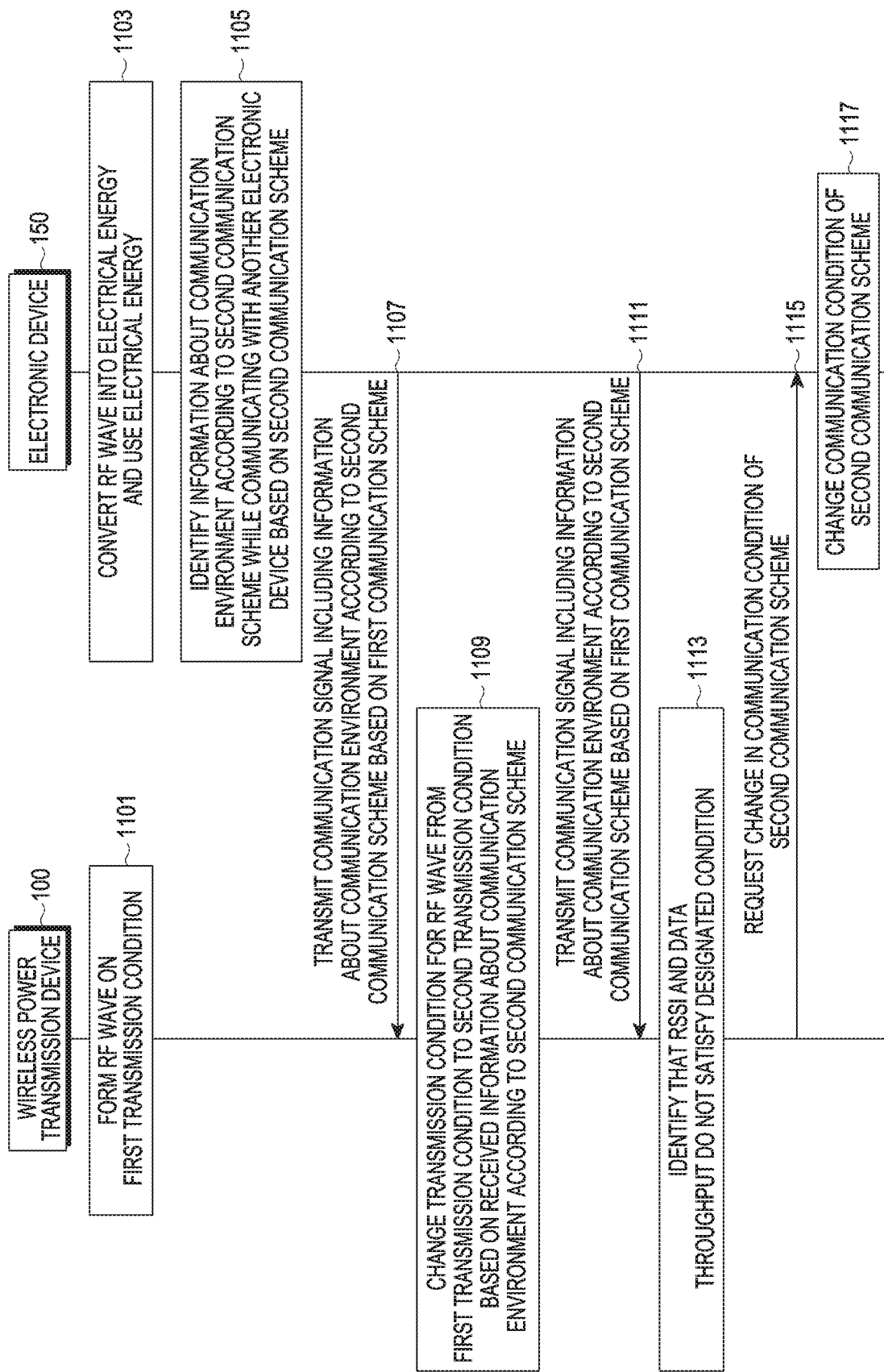
FIG. 11 illustrates a flowchart for describing an operating method of a wireless power transmission device and an electronic device according to various embodiments.

FIG. 11 illustrates a flowchart for describing an operating method of a wireless power transmission device and an electronic device according to various embodiments.

According to various embodiments, a wireless power transmission device 100 may form an RF wave on a first transmission condition in operation 1101. In operation 1103, an electronic device 150 may convert the RF wave into electrical energy and use the electrical energy. In operation 1105, the electronic device 150 may identify information about a communication environment according to a second communication scheme while performing a communication with another electronic device based on the second communication scheme. In operation 1107, the electronic device 150 may transmit a communication signal including the information about the communication environment according to the second communication scheme, based on a first communication scheme.

In operation 1109, the wireless power transmission device 100 may change a transmission frequency of the RF wave based on the received information about the communication environment according to the second communication scheme. In operation 1111, the electronic device 150 may transmit a communication signal including the information about the communication environment according to the second communication scheme, based on the first communication scheme. In operation 1113, the wireless power transmission device 100 may identify that RSSI and data throughput of the second communication scheme of the electronic device 150 do not satisfy a designated condition. In operation 1115, the wireless power transmission device 100 may transmit a signal requesting a change in a communication condition for the second communication scheme to the electronic device 150. In operation 1117, the electronic device 150 may change the communication condition for the second communication scheme. For example, the electronic device 150 may transmit and receive a communication signal from and to an AP to change an operation frequency.

Figure 12:
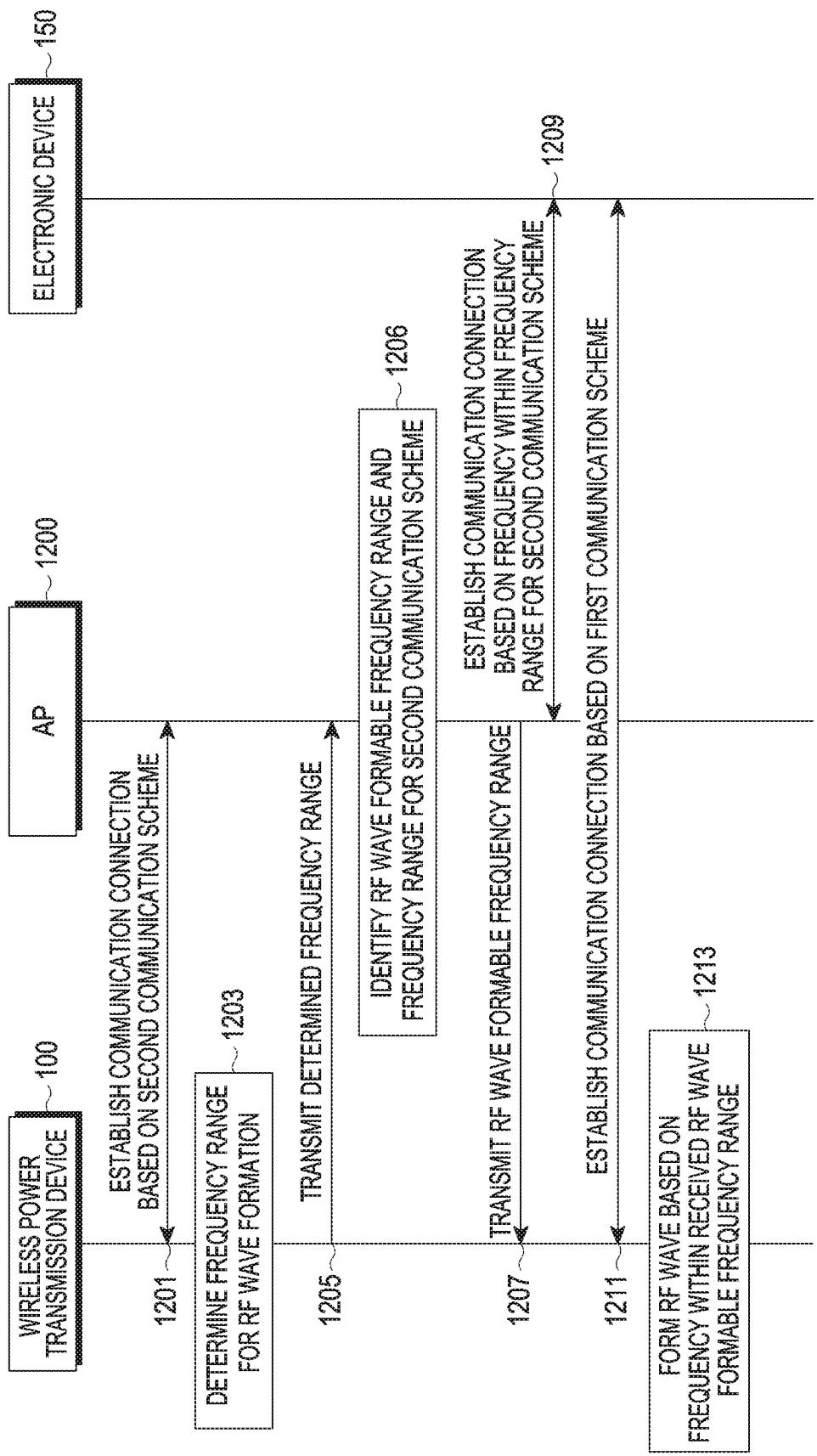
FIG. 12 illustrates a flowchart for describing an operating method of a wireless power transmission device, an electronic device, and an AP according to various embodiments.

FIG. 12 illustrates a flowchart for describing an operating method of a wireless power transmission device, an electronic device, and an AP according to various embodiments.

According to various embodiments, a wireless power transmission device 100 may establish a communication connection based on a second communication scheme in operation 1201. In this case, the wireless power transmission device 100 may include a first scheme-communication module capable of communicating with an electronic device 150 and a second scheme-communication module capable of communicating with an AP 1200. In operation 1203, the wireless power transmission device 100 may determine a frequency range for RF wave formation. In operation 1205, the wireless power transmission device 100 may transmit the determined frequency range to the AP 1200.

In operation 1206, the AP 1200 may identify an RF wave formable frequency range and a frequency range for the second communication scheme. The AP 1200 may determine the RF wave formable frequency range so that interference between the RF wave and a communication signal of the second communication scheme may be minimized, and determine the frequency range for the second communication scheme corresponding to the RF wave formable frequency range. In operation 1207, the AP 1200 may transmit the RF wave formable frequency range to the wireless power transmission device 100. In operation 1209, the AP 1200 may establish a communication connection based on a frequency within the frequency range for the second communication scheme. In operation 1211, the wireless power transmission device 100 may establish a communication connection based on the first communication scheme. In operation 1213, the wireless power transmission device 100 may form an RF wave based on a frequency within the received RF wave formable frequency range. Accordingly, interference between the RF wave and the communication signal of the second communication scheme may be minimized. Meanwhile, in an embodiment in FIG. 12, the AP 1200 determines the transmission frequency range of the RF wave and the frequency range for the second communication scheme, but this is merely exemplary. According to various embodiments, the wireless power transmission device 100 may determine the transmission frequency range of the RF wave and the frequency range for the second communication scheme, and transmit the frequency range for the second communication scheme to the AP 1200. In addition, if the wireless power transmission device 100 does not include the second scheme-communication module, the wireless power transmission device 100 and the AP 1200 may perform a communication via relay of the electronic device 150. In this case, the electronic device 150 may be configured to perform transcoding between a first-communication scheme communication signal and a second-communication scheme communication signal.

Figure 13:
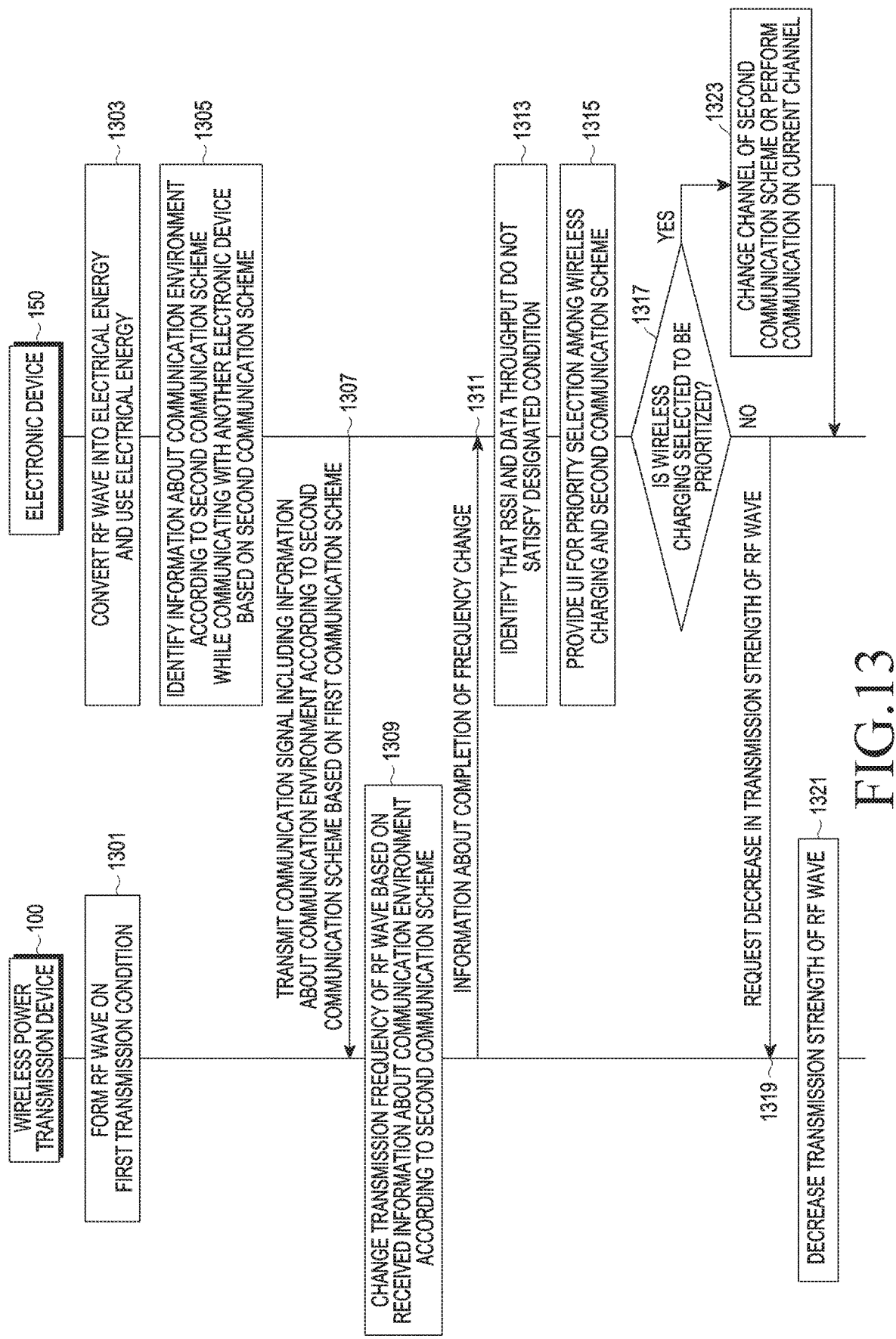
FIG. 13 illustrates a flowchart for describing an operating method of a wireless power transmission device and an electronic device according to various embodiments.
Figure 14:
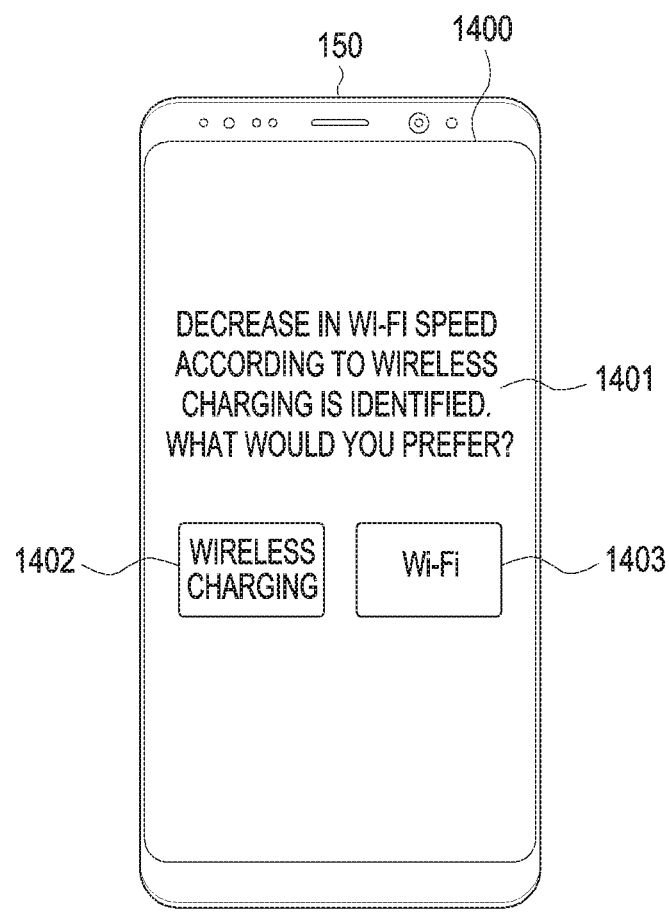
FIG. 14 illustrates an electronic device according to various embodiments.

FIG. 13 illustrates a flowchart for describing an operating method of a wireless power transmission device and an electronic device according to various embodiments. An embodiment in FIG. 13 will be described in more detail with reference to FIG. 14. FIG. 14 illustrates an electronic device according to various embodiments.

According to various embodiments, a wireless power transmission device 100 may form an RF wave on a first transmission condition in operation 1301. In operation 1103, the electronic device 150 may convert the RF wave into electrical energy and use the electrical energy. In operation 1305, the electronic device 150 may identify information about a communication environment according to a second communication scheme while performing a communication with another electronic device based on the second communication scheme. In operation 1307, the electronic device 150 may transmit a communication signal including the information about the communication environment according to the second communication scheme, based on a first communication scheme. In operation 1309, the wireless power transmission device 100 may change a transmission frequency of the RF wave based on the received information about the communication environment according to the second communication scheme. In operation 1311, the wireless power transmission device 100 may transmit information about completion of a frequency change for the RF wave to the electronic device 150.

In operation 1313, the electronic device 150 may identify that RSSI and data throughput do not satisfy a designated condition. In operation 1315, the electronic device 150 may provide a UI for priority selection among wireless charging and the second communication scheme. For example, as in FIG. 14, the electronic device 150 may display a UI 1400 for priority selection. The UI 1400 for priority selection may include a message 1401 for selecting a priority, a wireless charging selection button 1402, or a second-communication scheme (e.g., Wi-fi) selection button 1403.

In operation 1317, the electronic device 150 may identify whether the wireless charging is selected to be prioritized. For example, the electronic device 150 may identify whether the wireless charging selection button 1402 of the UI 1400 is selected or the second-communication scheme selection button 1403 is selected. If it is identified that the second communication scheme is selected to be prioritized, in operation 1319, the electronic device 150 may request decrease in transmission strength of the RF wave. Upon receiving the request for the decrease in the transmission strength of the RF wave, the wireless power transmission device 100 may decrease the transmission strength of the RF wave in operation 1321. If it is identified that the wireless charging is selected to be prioritized, the electronic device 150 may change a channel of the second communication scheme or perform a communication on a current channel in operation 1323.

Figure 15:
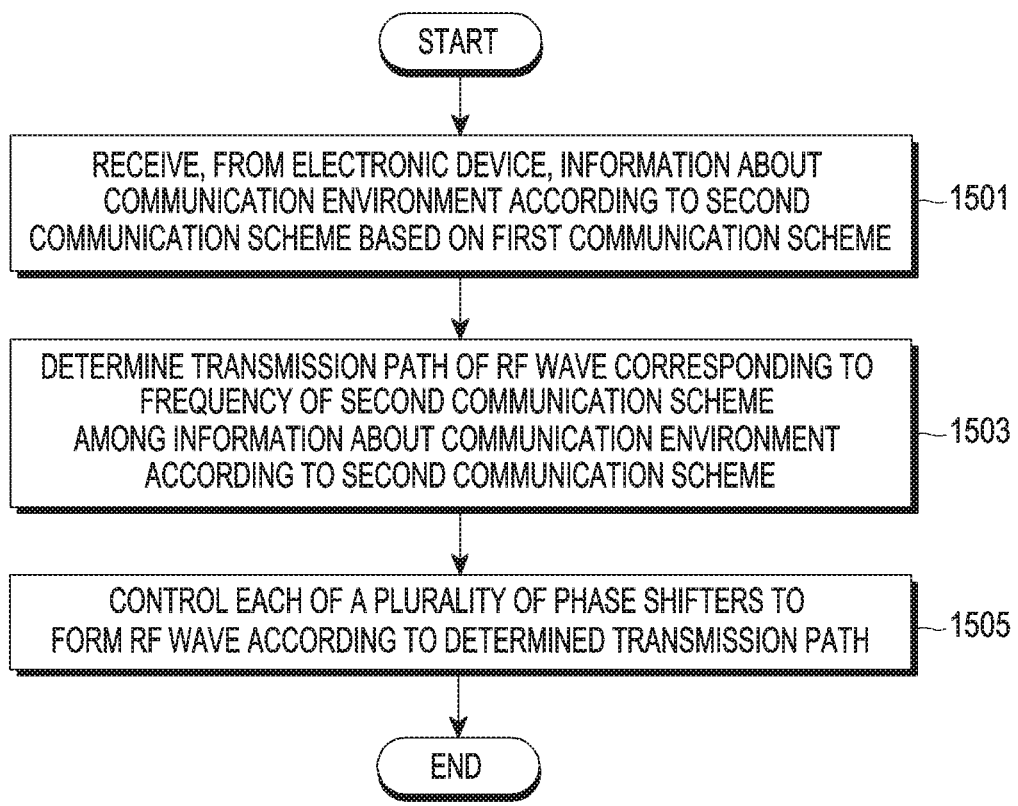
FIG. 15 illustrates a flowchart for describing an operating method of a wireless power transmission device according to various embodiments.

FIG. 15 illustrates a flowchart for describing an operating method of a wireless power transmission device according to various embodiments.

In operation 1501, a wireless power transmission device 100 according to various embodiments may receive, from an electronic device 150, information about a communication environment according to a second communication scheme based on a first communication scheme. In operation 1503, the wireless power transmission device 100 may determine a transmission path of an RF wave corresponding to a frequency of the second communication scheme among the information about the communication environment according to the second communication scheme. For example, the wireless power transmission device 100 may store association information between the information about the communication environment according to the second communication scheme and the transmission path of the RF wave. The wireless power transmission device 100 may determine the transmission path of the RF wave based on the stored association information. In operation 1505, the wireless power transmission device 100 may control each of a plurality of phase shifters to form the RF wave according to the determined transmission path.

Figure 16:
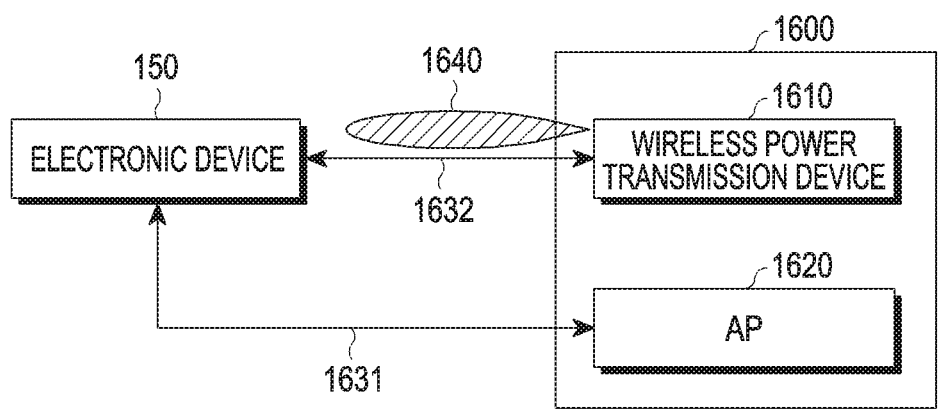
FIG. 16 is a block diagram illustrating an external electronic device and an electronic device according to various embodiments.

FIG. 16 is a block diagram illustrating an external electronic device and an electronic device according to various embodiments.

Referring to FIG. 16, an external electronic device 1600 according to various embodiments may include a wireless power transmission device 1610 and an AP 1620. The wireless power transmission device 1610 may include at least some of components included in a wireless power transmission device 100 in FIG. 2a. The AP 1620 may transmit and receive a communication signal 1631 from and to an electronic device 150 based on a second communication method (e.g., a Wi-fi communication scheme). The wireless power transmission device 1610 and the AP 1620 may be implemented as one external electronic device 1600. For example, the wireless power transmission device 1610 and the AP 1620 may be included within a housing, and may be wiredly connected to transmit and receive data. Alternatively, the wireless power transmission device 1610 and the AP 1620 are not disposed within one housing, but may be implemented to be wiredly connected to transmit and receive data.

The wireless power transmission device 1610 may include, for example, a communication circuit (e.g., a Bluetooth communication circuit) which is based on a first communication scheme, and may transmit and receive a communication signal 1632 which is based on the first communication scheme to and from the electronic device 150. According to implementation, the communication circuit which is based on the first communication scheme may not be included in the wireless power transmission device 1610. In this case, the wireless power transmission device 1610 may control power transmission based on information received via the AP 1620. The wireless power transmission device 1610 may form an RF wave 1640, and the electronic device 150 may convert the formed RF wave 1640 into electrical energy and use the electrical energy. As described above, the external electronic device 1600 according to various embodiments may perform wireless charging by simultaneously forming the RF wave 1640 while communicating with the electronic device 150 based on the second communication scheme.

Figure 17A:
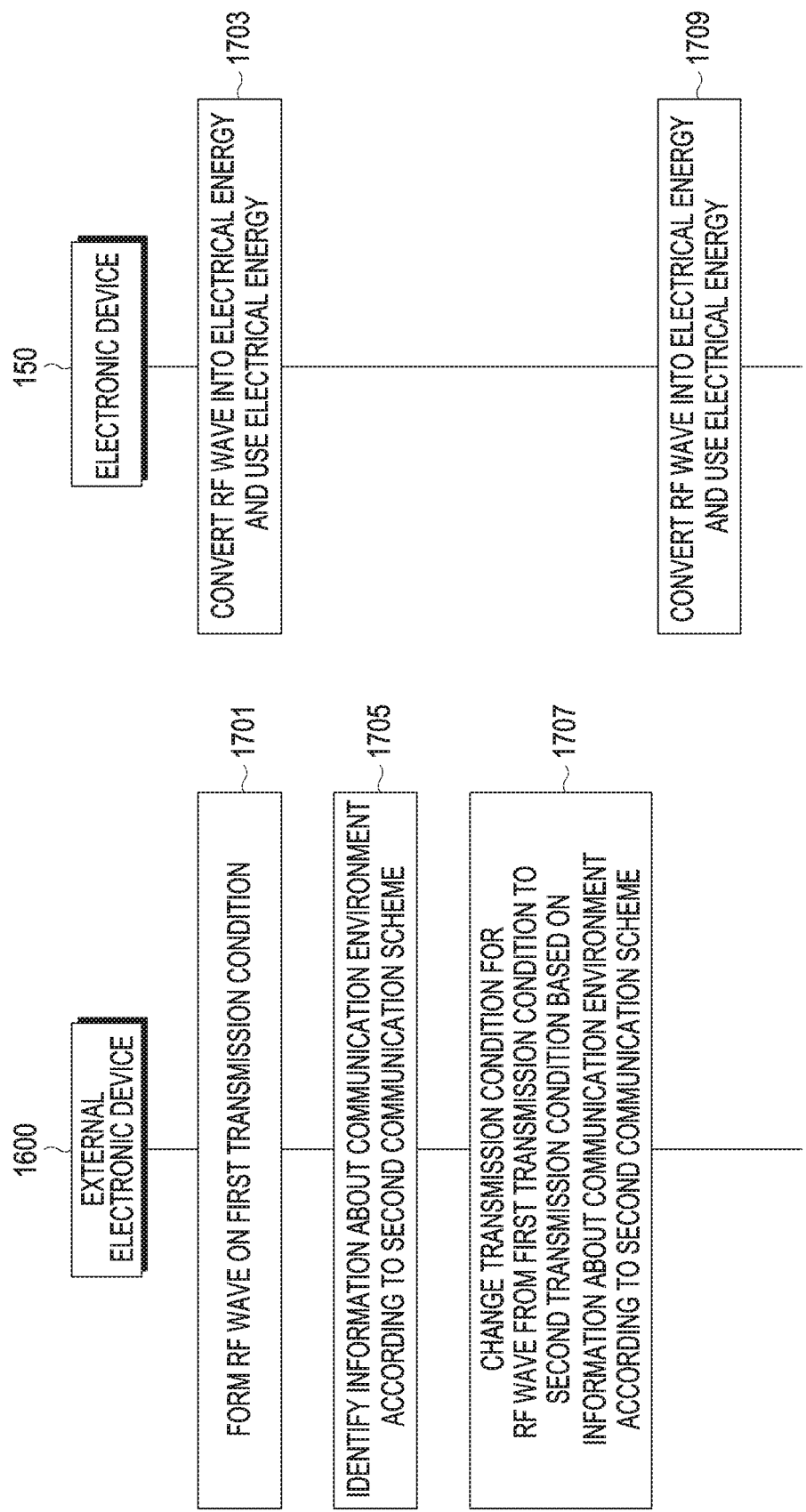
FIG. 17A illustrates a flowchart for describing an operating method of an external electronic device and an electronic device according to various embodiments.

FIG. 17*a* illustrates a flowchart for describing an operating method of an external electronic device and an electronic device according to various embodiments.

According to various embodiments, in operation 1701, an external electronic device 1600 may form an RF wave on a first transmission condition. The external electronic device 1600 may form the RF wave with the first transmission condition using a wireless power transmission device 1610 included in the external electronic device 1600. For example, the wireless power transmission device 1610 may identify a location of an electronic device 150, and may form the RF wave with the first transmission condition based thereon. In operation 1703, the electronic device 150 may convert the RF wave into electrical energy and use the electrical energy.

In operation 1705, the external electronic device 1600 may identify information about a communication environment according to a second communication scheme. The external electronic device 1600 may identify the information about the communication environment according to the second communication scheme using an AP 1620 included in the external electronic device 1600. For example, the AP 1620 may identify the information about the communication environment according to the second communication scheme based on a communication signal received from the electronic device 150. The external electronic device 1600 may determine at least one of a frequency of a source signal for forming the RF wave or transmission strength of the RF wave corresponding to reception strength information of the communication signal received from the electronic device 1500 and data throughput according to the second communication scheme. A process of changing a transmission condition for the RF wave based on the received communication signal has been described in detail, and thus, further description will be omitted herein. In operation 1707, the external electronic device 1600 may change the transmission condition for the RF wave from a first transmission condition to a second transmission condition, based on the information about the communication environment according to the second communication scheme. In operation 1709, the electronic device 150 may convert an RF wave into electrical energy and use the electrical energy.

In various embodiments, the external electronic device 1600 may change a communication condition (e.g., a communication frequency, or a communication channel) of the AP 1620 based on the information about the communication environment according to the second communication scheme. For example, the external electronic device 1600 may change the communication frequency (or the communication channel) of the AP 1620 so that difference between a frequency of the RF wave and the communication frequency of the AP 1620 is greater than or equal to a designated value.

Figure 17B:
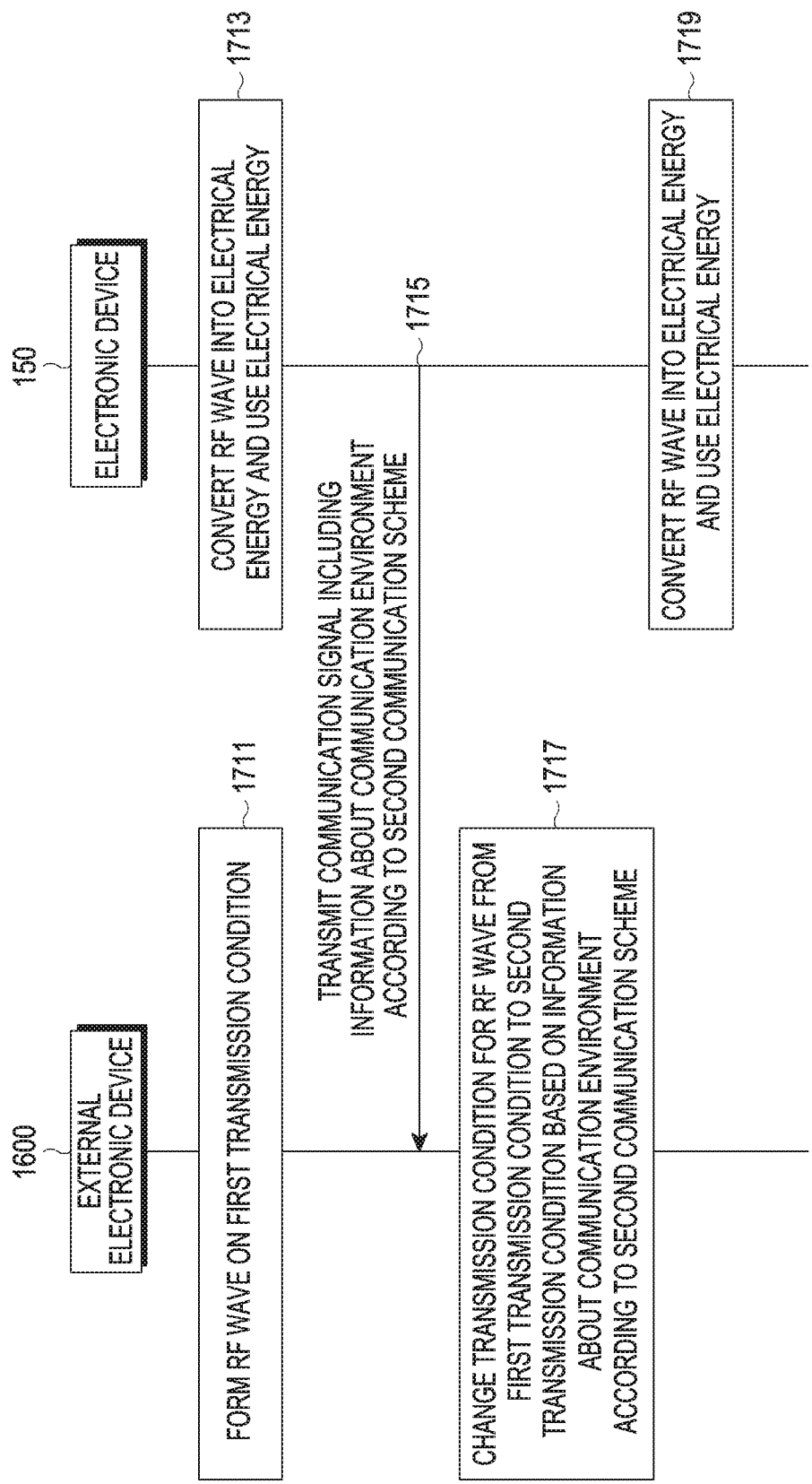
FIG. 17B illustrates a flowchart for describing an operating method of an external electronic device and an electronic device according to various embodiments.

FIG. 17*b* illustrates a flowchart for describing an operating method of an external electronic device and an electronic device according to various embodiments.

In operation 1711, an external electronic device 1600 may form an RF wave with a first transmission condition. In operation 1713, an electronic device 150 may convert the RF wave into electrical energy and use the electrical energy. In operation 1715, the electronic device 150 may transmit a communication signal including information about a communication environment according to a second communication scheme. For example, as in operation 307 in FIG. 3*a*, the electronic device 150 may transmit the communication signal including the information about the communication environment according to the second communication scheme.

In operation 1717, the external electronic device 1600 may change a transmission condition for the RF wave from a first transmission condition to a second transmission condition, based on the information about the communication environment according to the second communication scheme. In operation 1719, the electronic device 150 may convert an RF wave into electrical energy and use the electrical energy.

In still another embodiment, the external electronic device 1600 may control an AP 1620 based on the information about the communication environment according to the second communication scheme to change a communication condition (e.g., a communication frequency, or a communication channel) of the second communication scheme.

In various embodiments, the external electronic device 1600 may adjust at least one of the transmission condition for the RF wave or the communication condition of the second communication scheme by using all of an analysis result (e.g., reception strength, and data throughput of a communication signal) for a communication signal which is received according to the second communication scheme and information (e.g., reception strength of a communication signal received in the electronic device 150, and data throughput measured in the electronic device 150) included in a first-communication scheme communication signal.

Figure 17C:
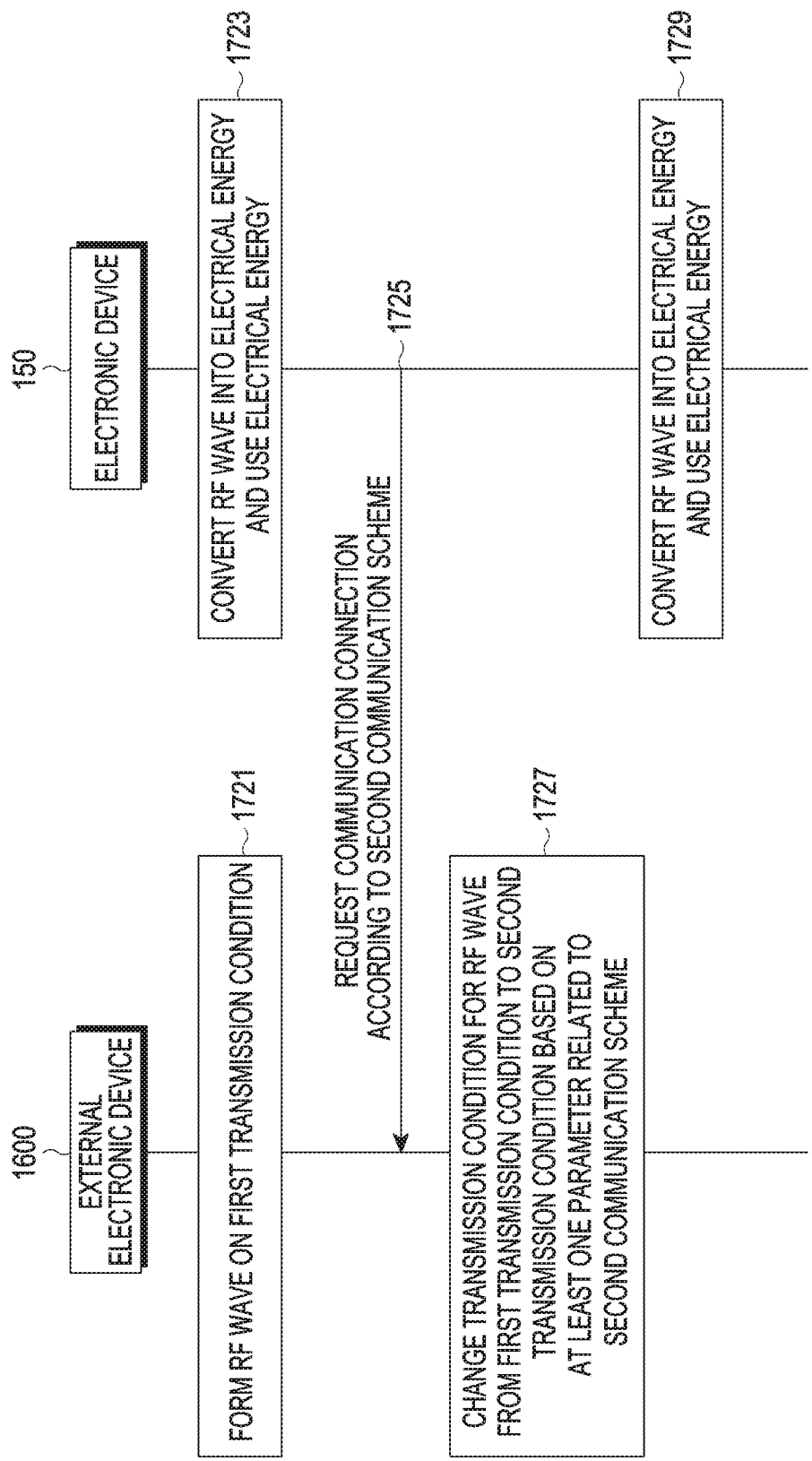
FIG. 17C illustrates a flowchart for describing an operating method of an external electronic device and an electronic device according to various embodiments.

FIG. 17*c* illustrates a flowchart for describing an operating method of an external electronic device and an electronic device according to various embodiments.

According to various embodiments, in operation 1721, an external electronic device 1600 may form an RF wave with a first transmission condition. In operation 1723, an electronic device 150 may convert the RF wave into electrical energy and use the electrical energy. In operation 1725, the electronic device 150 may request a communication connection according to a second communication scheme. For example, the electronic device 150 may discover an AP 1620 included in the external electronic device 1600 and request the communication connection from the discovered AP 1620 automatically or based on a user's input. In operation 1727, the external electronic device 1600 may change a transmission condition for the RF wave from a first transmission condition to a second transmission condition, based on at least one parameter related to the second communication scheme. For example, the external electronic device 1600 may change the transmission condition for the RF wave from the first transmission condition to the second transmission condition based on a communication frequency of the second communication scheme. The external electronic device 1600 may change a transmission frequency of the RF wave so that the transmission frequency of the RF wave differs from the communication frequency of the second communication scheme by a value greater than or equal to a designated value. In operation 1729, the electronic device 150 may convert an RF wave into electrical energy and use the electrical energy.

In still another embodiment, the external electronic device 1600 may determine the parameter of the second communication scheme based on the transmission condition of the RF wave already being used. The external electronic device 1600 may determine the communication frequency (or a communication channel) of the second communication scheme, for example, so that difference between the transmission frequency of the RF wave and the communication frequency of the second communication scheme is greater than or equal to a designated value.

Figure 17D:
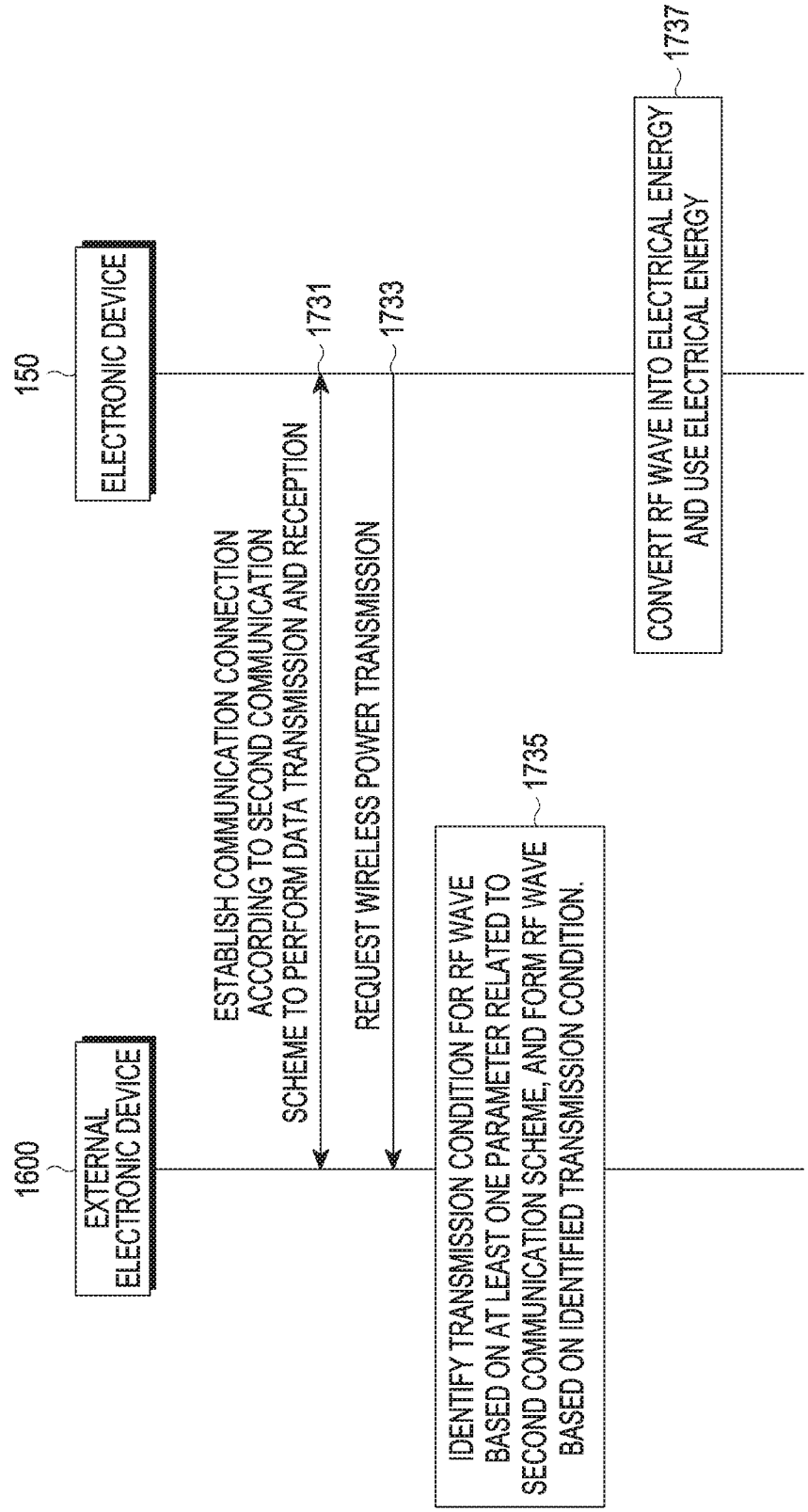
FIG. 17D illustrates a flowchart for describing an operating method of an external electronic device and an electronic device according to various embodiments.

FIG. 17d illustrates a flowchart for describing an operating method of an external electronic device and an electronic device according to various embodiments.

According to various embodiments, in operation 1731, an external electronic device 1600 and an electronic device 150 may establish a communication connection according to a second communication scheme to perform data transmission and reception. As described above, the electronic device 150 may discover an AP 1620 included in the external electronic device 1600, and establish a communication connection with the discovered AP 1620 automatically or based on a user's selection.

In operation 1733, the electronic device 150 may request wireless power transmission from the external electronic device 1600 or a wireless power transmission device 1610. The electronic device 150 may request the wireless power transmission from the wireless power transmission device 1610 based on a first communication scheme. Alternatively, the electronic device 150 may request the wireless power transmission from the AP 1620 based on the second communication scheme.

In operation 1735, the external electronic device 1600 may identify a transmission condition for the RF wave based on at least one parameter related to the second communication scheme, and form the RF wave based on the identified transmission condition. For example, the external electronic device 1600 may determine a transmission frequency of the RF wave so that the transmission frequency of the RF wave differs from a communication frequency of the second communication scheme by a value greater than or equal to a designated value. In operation 1737, the electronic device 150 may convert the RF wave into electrical energy and use the electrical energy.

In still another embodiment, the external electronic device 1600 may change the parameter of the second communication scheme based on the transmission condition for the RF wave already being used. The external electronic device 1600 may change a communication frequency (or a communication channel) of the second communication scheme, for example, so that difference between a transmission frequency of the RF wave and the communication frequency of the second communication scheme is greater than or equal to a designated value.

Figure 18:
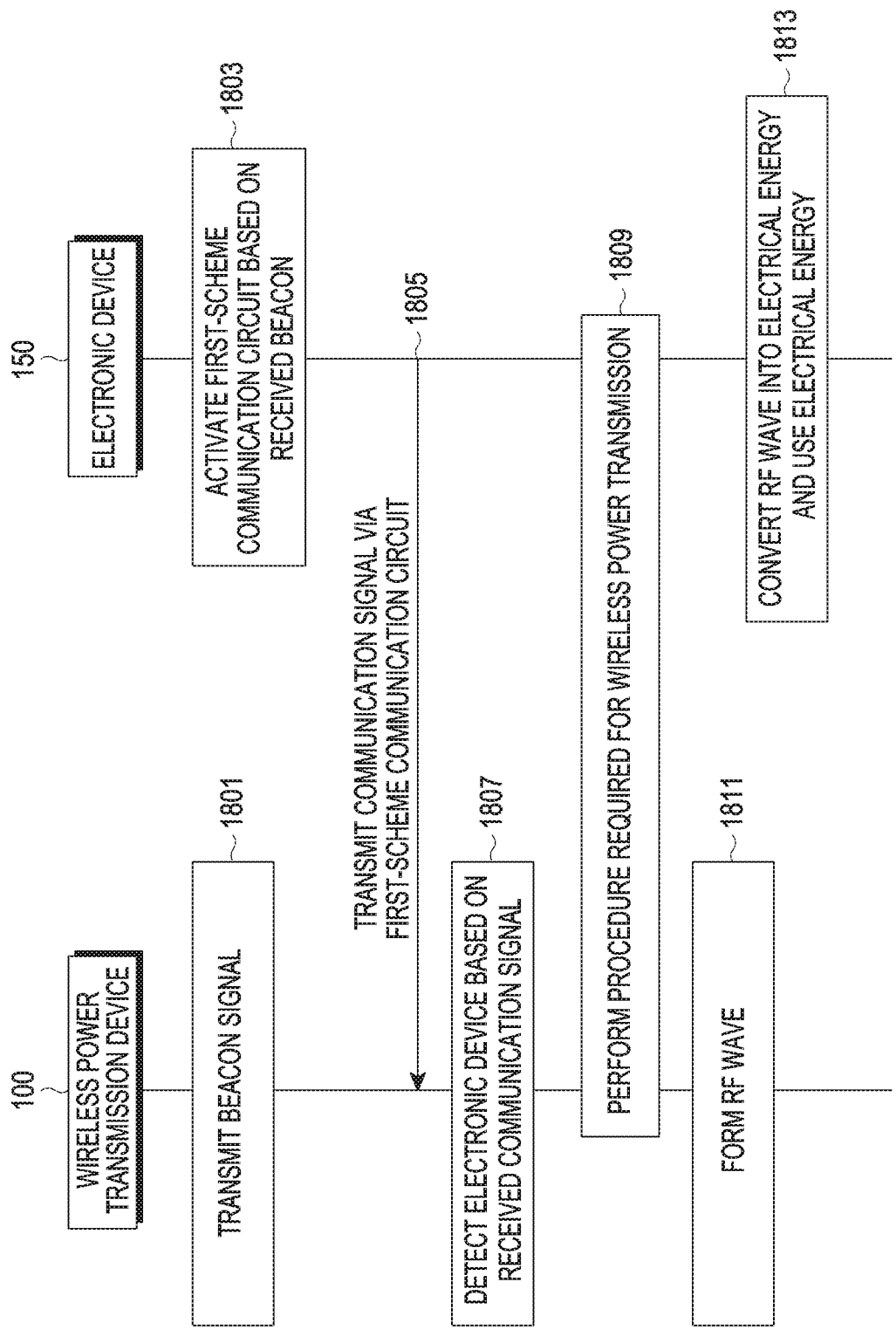
FIG. 18 illustrates a flowchart for describing an operating method of a wireless power transmission device and an electronic device according to various embodiments.

FIG. 18 illustrates a flowchart for describing an operating method of a wireless power transmission device and an electronic device according to various embodiments.

According to various embodiments, a wireless power transmission device 100 may transmit a beacon signal in operation 1801. The wireless power transmission device 100 may transmit the beacon signal in various directions. The wireless power transmission device 100 may form the beacon signal, i.e., an RF wave, based on a pre-designated steering direction change rule. Accordingly, an electronic device 150 which is disposed near the wireless power transmission device 100 may receive the beacon signal.

In operation 1803, the electronic device 150 may activate a first-scheme communication circuit based on the received beacon. The beacon signal may be used for the first-scheme communication circuit (e.g., a first-scheme communication circuit 253) to be turned on and then transmit a pre-designated communication signal (e.g., an advertisement signal). Alternatively, the electronic device 150 may turn on the first-scheme communication circuit 253 by using a power from a battery 257 within the electronic device 150. For example, the electronic device 150 may turn on the first-scheme communication circuit 253 based on a magnitude of a power received in a power receiving circuit 259 (for example, at least one of a magnitude of a voltage or a magnitude of a current in at least one of an input terminal of a rectifier or an output terminal of the rectifier, or at least one of a magnitude of a voltage or a magnitude of a current of an output terminal of a DC/DC convert). That is, the electronic device 150 may turn on the first scheme-communication circuit 253 when the magnitude of the received power is a magnitude which corresponds to the reception of the beacon signal. Alternatively, the beacon signal may include designated information, and the electronic device 150 may receive the beacon signal to identify the designated information. The electronic device 150 may turn on the first-scheme communication circuit 253 based on the identification of the designated information.

In operation 1805, the electronic device 150 may transmit a communication signal via the first-scheme communication circuit. In operation 1807, the wireless power transmission device 100 may detect the electronic device 150 based on a received communication signal. In various embodiments, if a designated communication signal (e.g., an advertisement signal) is received within pre-set time after the beacon signal is generated, the wireless power transmission device 100 may identify that the electronic device 150 is detected. Alternatively, if the designated communication signal is received within the pre-set time after the beacon signal is generated, and strength of the received communication signal is stronger than or equal to a threshold value, the wireless power transmission device 100 may identify that the electronic device 150 is detected.

In operation 1809, at least one of the wireless power transmission device 100 and the electronic device 150 may perform a procedure required for wireless power transmission. For example, the wireless power transmission device 100 may establish a communication connection (e.g., a BLE connection) with the electronic device 150. The wireless power transmission device 100 and the electronic device 150 may exchange communication signals including respective product information, and the wireless power transmission device 100 may cause the electronic device 150 to subscribe to a power network managed by the wireless power transmission device 100 via the corresponding process.

In operation 1811, the wireless power transmission device 100 may form an RF wave for charging. In operation 1813, the electronic device 150 may convert the RF wave into electrical energy and use the electrical energy.

In various embodiments, the wireless power transmission device 100 may transmit a beacon signal with a first beam width. The first beam width may be set larger than a second beam width of the RF wave for subsequent charging.

Figure 19:
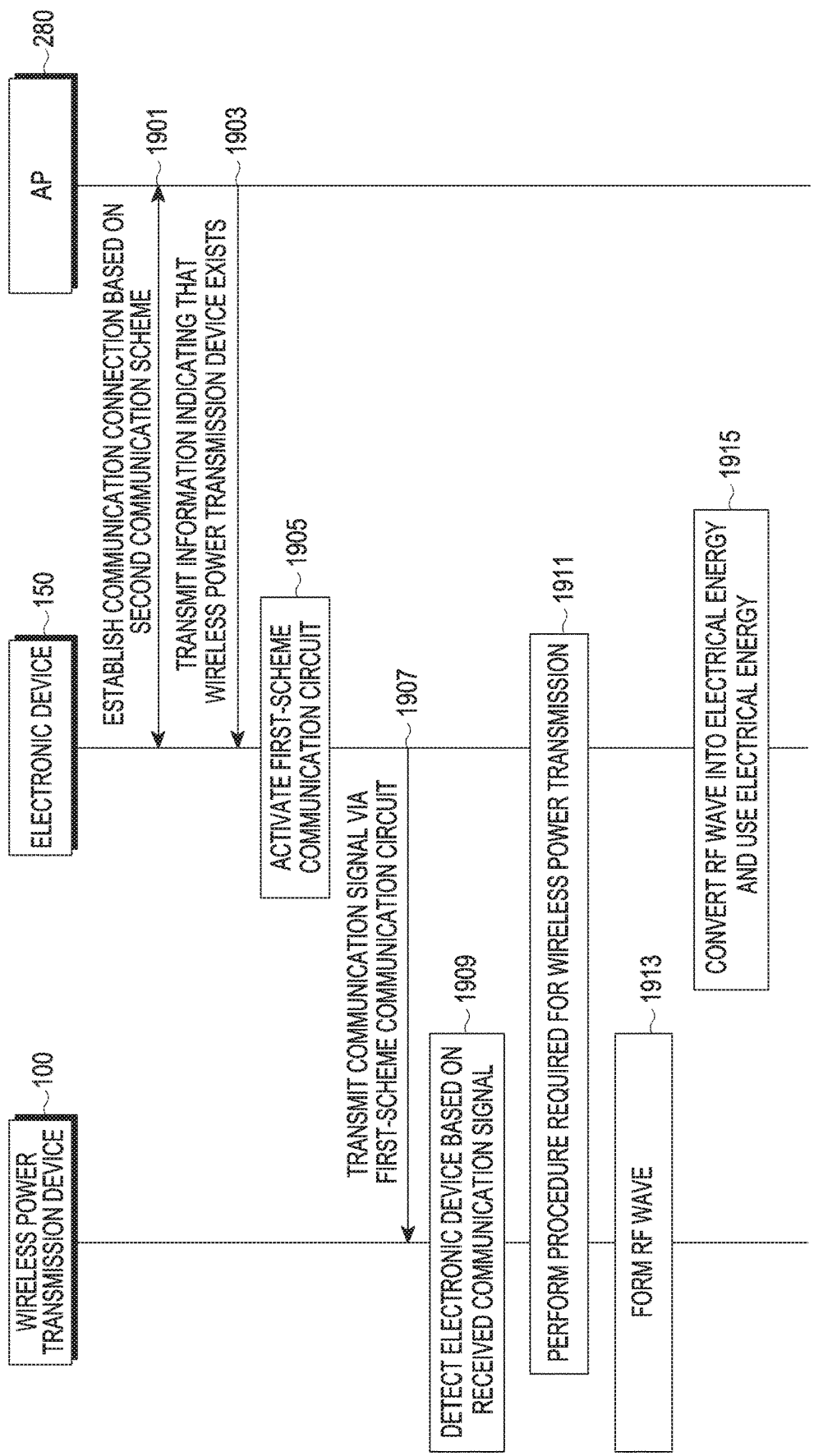
FIG. 19 illustrates a flowchart for describing an operating method of a wireless power transmission device, an electronic device, and an AP according to various embodiments.

FIG. 19 illustrates a flowchart for describing an operating method of a wireless power transmission device, an electronic device, and an AP according to various embodiments.

According to various embodiments, in operation 1901, an AP 280 may establish a communication connection with an electronic device 150 based on a second communication scheme. In operation 1903, the AP 280 may transmit information indicating that a wireless power transmission device 100 exists to the electronic device 150. For example, the AP 280 may identify the information indicating that the wireless power transmission device 100 exists based on external input on installation or based on performing a communication with the wireless power transmission device 100. The AP 280 may transmit a communication signal including the information indicating that the wireless power transmission device 100 exists to the electronic device 150. The AP 280 may include the information indicating that the wireless power transmission device 100 exists into various communication signals, and transmit the communication signal, and there is no limitation on a type of the communication signal including the information indicating that the wireless power transmission device 100 exists.

In operation 1905, the electronic device 150, based on the received information indicating that the wireless power transmission device 100 exists, may activate a first-communication scheme communication circuit (e.g., a first-scheme communication circuit 253). In operation 1907, the electronic device 150 may transmit a communication signal to the wireless power transmission device 100 via the first-communication scheme communication circuit 258. In operation 1909, the wireless power transmission device 100 may detect the electronic device 150 based on the received communication signal. At least one of the wireless power transmission device 100 or the electronic device 150 may perform a procedure required for wireless power transmission in operation 1911. In operation 1913, the wireless power transmission device 100 may form an RF wave. In operation 1915, the electronic device 150 may convert the RF wave into electrical energy and use the electrical energy.

Figure 20:
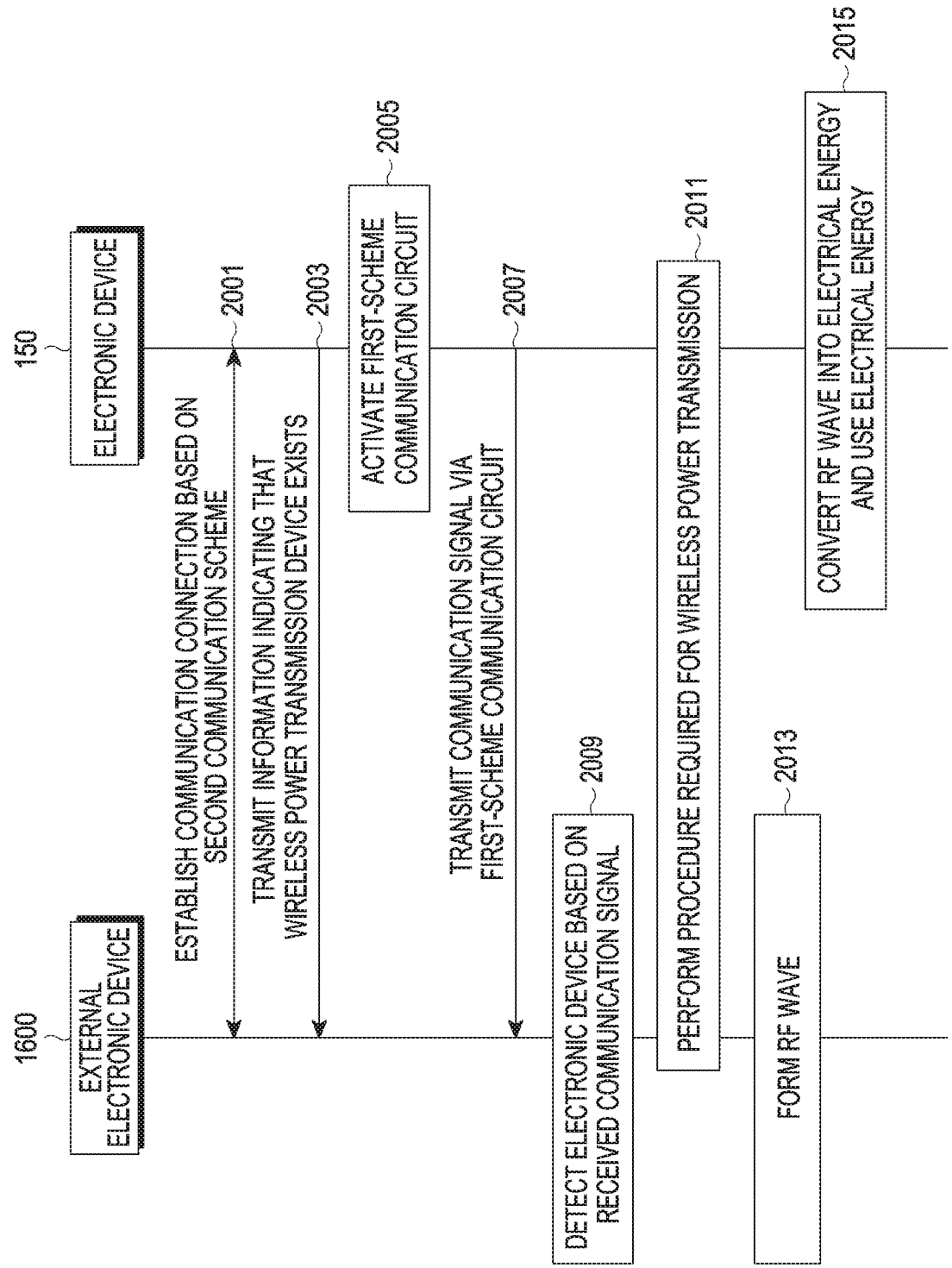
FIG. 20 illustrates a flowchart for describing an operating method of an external electronic device and an electronic device according to various embodiments.

FIG. 20 illustrates a flowchart for describing an operating method of an external electronic device and an electronic device according to various embodiments.

According to various embodiments, an external electronic device 1600 and an electronic device 150 may establish a communication connection based on a second communication scheme in operation 2001. In operation 2003, the external electronic device 1600 may transmit, to the electronic device 150, information indicating that a wireless power transmission device exists, i.e., information indicating that the external electronic device 1600 may perform wireless power transmission. The external electronic device 1600 may transmit, to the electronic device 150 via an AP 1620 included in the external electronic device 1600, a communication signal including the information indicating that the wireless power transmission device exists, and there is no limitation on a type of the communication signal including the information indicating that the wireless power transmission device exists.

In operation 2005, the electronic device 150 may activate a first-communication scheme communication circuit based on the information indicating that the wireless power transmission device exists. In operation 2007, the electronic device 150 may transmit a communication signal via the first-communication scheme communication circuit. In operation 2009, the external electronic device 1600 may detect the electronic device 150 based on the received communication signal. At least one of the external electronic device 1600 or the electronic device 150, in operation 2011, may perform a procedure required for wireless power transmission. In operation 2013, the external electronic device 1600 may form an RF wave. In operation 2015, the electronic device 150 may convert the RF wave into electrical energy and use the electrical energy.

Various embodiments in the present document may be implemented by software (e.g., a program) including instructions stored in machine-readable (e.g., computer-readable) storage media (e.g., an internal memory or an external memory). A machine is a device that is capable of invoking a stored instruction from a storage medium and capable of operating according to the invoked instruction, and may include an electronic device (e.g., at least one of a wireless power transmission device 100 or an electronic device 150) according to embodiments disclosed herein. The instruction, when executed by a processor (e.g., at least one of a control circuit 202 or a control circuit 252), may cause the processor to directly execute a function corresponding to the instruction or cause other components to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

According to an embodiment, a method according to various embodiments of the present document may be included and provided in a computer program product. The computer program product may be traded as a product between a seller and a buyer. The computer program product may be distributed in a form of a machine-readable storage medium (e.g., a compact disc read only memory (CD-ROM)), or may be distributed online via an application store (e.g., Play Store™). If distributed online, at least part of the computer program product may be temporarily generated or at least temporarily stored in a storage medium, such as a memory of a manufacturer's server, a server of the application store, or a relay server.

Each of components (e.g., modules or programs) according to various embodiments may include a single entity or multiple entities, and in various embodiments, some sub components among the above sub components may be omitted, or other sub components may be added. Alternatively or additionally, some components (e.g., modules or programs) may be integrated into a single entity, and the integrated entity may still perform functions performed by each of the corresponding components in the same or similar manner as before the corresponding components are integrated. Operations performed by a module, a programming module, or other components according to various embodiments may be executed sequentially, in parallel, repeatedly, or in a heuristic manner, or at least some operations may be executed according to another sequence, may be omitted, or may further include other operations.

The invention claimed is:

1. A wireless power transmission device, comprising:
a first-scheme communication circuit configured for first-scheme communication;
a power source configured to generate a source signal;
a power transmission circuit configured to form a radio frequency (RF) wave based on the source signal; and
a control circuit, wherein the control circuit is configured to:
receive, via the first-scheme communication circuit, from an electronic device which supports the first-scheme communication and second-scheme communication different from the first-scheme communication, a first-scheme communication signal including second-scheme communication information for communication of the electronic device with an external electronic device different from the wireless power transmission device, and
control, based on the second-scheme communication information, at least one of a frequency of the source signal generated by the power source or transmission strength of the RF wave.

2. The wireless power transmission device of claim 1, wherein the power source includes a voltage controlled oscillator (VCO), and
wherein the control circuit is configured to control a magnitude of an input voltage of the VCO based on the second-scheme communication information.

3. The wireless power transmission device of claim 1, wherein the second-scheme communication information includes information about a frequency of a second-scheme communication signal for the second-scheme communication by the electronic device, and
wherein the control circuit is configured to control the power source so that the frequency of the source signal differs from the frequency of the second-scheme communication signal by a value which is greater than or equal to a designated threshold value.

4. The wireless power transmission device of claim 1, wherein the second-scheme communication information includes at least one of reception strength information about reception strength of a second-scheme communication signal by the electronic device or data throughput information about data throughput of the second-scheme communication by the electronic device, and
wherein the control circuit is configured to control the at least one of the frequency of the source signal or the transmission strength of the RF wave based on the at least one of the reception strength information or the data throughput information.

5. The wireless power transmission device of claim 4, wherein the control circuit is configured to:
identify whether the data throughput of the second-scheme communication is less than a minimum value of data throughput which is set according to the reception strength of the second-scheme communication signal, and
based on the data throughput of the second-scheme communication being less than the minimum value, control the at least one of the frequency of the source signal or the transmission strength of the RF wave.

6. The wireless power transmission device of claim 5, wherein the control circuit is configured to:

sequentially receive, via the first-scheme communication circuit, at least one other first-scheme communication signal including the second-scheme communication information, and
control the at least one of the frequency of the source signal or the transmission strength of the RF wave until the second-scheme communication information satisfies a designated condition.

7. The wireless power transmission device of claim 6, wherein the control circuit is configured to:
based on the second-scheme communication information satisfying the designated condition, maintain the at least one of the frequency of the source signal or the transmission strength of the RF wave or increase the transmission strength of the RF wave.

8. The wireless power transmission device of claim 1, wherein the control circuit is configured to:
control the frequency of the source signal based on the second-scheme communication information,
after controlling the frequency of the source signal, receive, via the first-scheme communication circuit, another first-scheme communication signal including second-scheme communication information about a communication environment for second-scheme communication by the electronic device after frequency change, and
control the transmission strength of the RF wave based on the second-scheme communication information after the frequency change included in the other first-scheme communication signal.

9. The wireless power transmission device of claim 1, wherein the power transmission circuit comprises:
a first amplification circuit configured to amplify the source signal;
a distribution circuit configured to distribute the amplified source signal into a plurality of sub signals;
a plurality of phase shifters configured to shift phases of the plurality of sub signals, respectively;
a plurality of attenuators configured to adjust amplitude of the plurality of sub signals, respectively; and
a plurality of second amplification circuits configured to amplify the plurality of sub signals, respectively, and
wherein the control circuit is configured to control a gain of at least one of the first amplification circuit or the second amplification circuits based on the second-scheme communication information.

10. The wireless power transmission device of claim 1, further comprising:
a second-scheme communication circuit,
wherein the control circuit is configured to:
receive, from a server via the second-scheme communication circuit, association information between the second-scheme communication information and the at least one of the frequency of the source signal or the transmission strength of the RF wave, and
control, based on the association information and the second-scheme communication information, the at least one of the frequency of the source signal generated by the power source or the transmission strength of the RF wave.

11. The wireless power transmission device of claim 1, wherein the control circuit is configured to request a change in a frequency of the second-scheme communication by the electronic device via the first-scheme communication circuit.

12. The wireless power transmission device of claim 1, further comprising a second-scheme communication circuit, wherein the control circuit is configured to:
- transmit, via the second-scheme communication circuit, a first frequency range for forming the RF wave to an access point;
- receive, from the access point, via the second-scheme communication circuit, a second frequency range for forming the RF wave which is determined based on the first frequency range and a frequency used by the access point, and
- control the power source to form the RF wave of a frequency within the second frequency range.

13. The wireless power transmission device of claim 1, wherein the second-scheme communication information comprises information about a communication environment for communication by the electronic device with a Wi-Fi access point according to the second-scheme communication.

14. An electronic device comprising the wireless power transmission device of claim 1.

15. An operating method of a wireless power transmission device comprising a first-scheme communication circuit, a power source configured to generate a source signal, a power transmission circuit configured to form a radio frequency (RF) wave based on the source signal, and a control circuit, the operating method comprising:
- receiving, via the first-scheme communication circuit, from an electronic device which supports a first-scheme communication and a second-scheme communication, a first-scheme communication signal including second-scheme communication information for communication of the electronic device with an external electronic device different from the wireless power transmission device; and
- controlling, based on the second-scheme communication information, at least one of a frequency of the source signal generated by the power source or transmission strength of the RF wave.

16. The operating method of claim 15, wherein the power source includes a voltage controlled oscillator (VCO), and
wherein controlling, based on the second-scheme communication information, the at least one of the frequency of the source signal generated by the power source or the transmission strength of the RF wave comprises controlling a magnitude of an input voltage of the VCO based on the second-scheme information.

17. The operating method of claim 15, wherein the second-scheme communication information includes information about a frequency of a second-scheme communication signal for the second-scheme communication by the electronic device, and
wherein controlling, based on the second-scheme communication information, the at least one of the frequency of the source signal generated by the power source or the transmission strength of the RF wave comprises controlling the power source so that the frequency of the source signal differs from the frequency of the second-scheme communication signal by a value which is greater than or equal to a designated threshold value.

18. The operating method according to claim 15, wherein the second-scheme communication information comprises information about a communication environment for communication by the electronic device with a Wi-Fi access point according to the second-scheme communication.

* * * * *